(12) United States Patent
Eguchi et al.

(10) Patent No.: US 11,597,161 B2
(45) Date of Patent: Mar. 7, 2023

(54) FASTENING METHOD AND FASTENING APPARATUS

(71) Applicant: DAI-ICHI DENTSU LTD., Tokyo (JP)

(72) Inventors: Takeshi Eguchi, Tokyo (JP); Daiki Tanabe, Tokyo (JP)

(73) Assignee: DAI-ICHI DENTSU LTD., Chofu (JP)

( * ) Notice: Subject to any disclaimer, the term of this patent is extended or adjusted under 35 U.S.C. 154(b) by 275 days.

(21) Appl. No.: 16/616,824

(22) PCT Filed: Jun. 28, 2018

(86) PCT No.: PCT/JP2018/024589
§ 371 (c)(1),
(2) Date: Nov. 25, 2019

(87) PCT Pub. No.: WO2019/013006
PCT Pub. Date: Jan. 17, 2019

(65) Prior Publication Data
US 2021/0046680 A1    Feb. 18, 2021

(30) Foreign Application Priority Data

Jul. 10, 2017    (JP) .............................. JP2017-134651
Dec. 25, 2017    (WO) .................. PCT/JP2017/046316

(51) Int. Cl.
*B21J 15/10*    (2006.01)
*B29C 65/36*    (2006.01)
(Continued)

(52) U.S. Cl.
CPC .......... *B29C 65/3616* (2013.01); *B29C 43/18* (2013.01); *F16B 19/06* (2013.01); *B29K 2101/12* (2013.01); *F16B 5/04* (2013.01)

(58) Field of Classification Search
CPC .. B23P 19/04; F16B 5/04; F16B 19/06; B29C 66/742; B29C 65/7841; B29C 66/81423;
(Continued)

(56) References Cited

U.S. PATENT DOCUMENTS 5,361,483 A * 11/1994 Rainville .......... B29C 66/73921
29/524.1
2005/0125985 A1* 6/2005 Adams .............. B29C 66/81831
29/524.1
(Continued)

FOREIGN PATENT DOCUMENTS

CN    106233002 A    12/2016    ................ F16B 5/04
CN    106414038 A    2/2017    ............. B29C 65/60
(Continued)

OTHER PUBLICATIONS

English translation of Matsugishi (JP2002067159) (Year: 2000).*
(Continued)

*Primary Examiner* — Jun S Yoo
(74) *Attorney, Agent, or Firm* — J-Tek Law PLLC; Jeffrey D. Tekanic; Scott T. Wakeman

(57) ABSTRACT

In a fastening method and fastening apparatus, workpieces are fastened using a fastener made of a thermoplastic polymer comprising carbon fibers. The method and apparatus involve induction heating of the carbon fibers to soften the thermoplastic polymer and then plastically deforming axial ends of the fastener using a die or dies to form first and second heads while a shaft body or a shaft part of the thermoplastic polymer comprising the carbon fibers is inserted through respective through holes formed in the workpieces.

13 Claims, 12 Drawing Sheets

(51) Int. Cl.
  *B29C 43/18* (2006.01)
  *F16B 19/06* (2006.01)
  *B29K 101/12* (2006.01)
  *F16B 5/04* (2006.01)

(58) Field of Classification Search
  CPC .......... B29C 66/81431; B29C 65/3668; B29C 66/43; B29C 66/41; B29C 66/83221; B29C 66/1122; B29C 66/7392; B29C 65/601; B29C 66/92443; B29C 66/92921; B29C 65/3684; B29C 65/3616; B29C 43/18
  See application file for complete search history.

(56) References Cited

U.S. PATENT DOCUMENTS

| | | | |
|---|---|---|---|
| 2006/0200967 A1 | 9/2006 | Adams et al. | |
| 2007/0033788 A1 | 2/2007 | Chitty et al. | |
| 2007/0067986 A1 | 3/2007 | Chitty et al. | |
| 2010/0133261 A1* | 6/2010 | Schildt | B29C 35/0805 219/635 |
| 2014/0356053 A1* | 12/2014 | Urayama | B29C 66/1162 156/92 |
| 2016/0284449 A1* | 9/2016 | Haq | B29C 65/4875 |
| 2016/0341234 A1 | 11/2016 | Germann et al. | |
| 2017/0066182 A1* | 3/2017 | Trudeau | B29C 70/845 |
| 2019/0338797 A1 | 11/2019 | Germann et al. | |
| 2021/0046593 A1 | 2/2021 | Eguchi et al. | |
| 2021/0129208 A1* | 5/2021 | Laberge Lebel | B21J 15/04 |

FOREIGN PATENT DOCUMENTS

| | | | | |
|---|---|---|---|---|
| CN | 10641403838 A | | 2/2017 | ............ F29C 65/60 |
| EP | 2097650 A2 | | 9/2009 | |
| FR | 2978510 A1 | | 2/2013 | ............ B29C 65/60 |
| JP | H04244609 A | | 9/1992 | |
| JP | H0592300 A | | 4/1993 | ............ B21J 15/28 |
| JP | H0592300 U | | 12/1993 | |
| JP | 2002067159 A | | 3/2002 | |
| JP | 2002067159 A | * | 3/2002 | ............ B29C 65/14 |
| JP | 2010099659 A | | 5/2010 | |
| JP | 2017511443 | | 4/2017 | |
| JP | 2017511443 A | | 4/2017 | ............ F16B 19/10 |
| JP | 2017114016 A | | 6/2017 | ............ B29C 65/72 |
| WO | 2005058525 A2 | | 6/2005 | |
| WO | WO 2005058 A2 | | 6/2005 | |
| WO | 2009061123 A2 | | 5/2009 | |
| WO | 2013094008 A1 | | 6/2013 | |
| WO | 2015132766 A1 | | 9/2015 | |
| WO | 2018163072 A1 | | 9/2018 | |

OTHER PUBLICATIONS

Communication from the EPO in counterpart EP application No. 18832363.8 dated Jan. 18, 2022, and examined claims 1-8.
English translation of International Preliminary Report on Patentability in parent application No. PCT/JP2018/024589 dated Nov. 29, 2019.
English translation of the International Search Report dated Jan. 17, 2019 for parent application No. PCT/JP2018/024589.
English translation of the Written Opinion of the International Searching Authority for parent application No. PCT/JP2018/024589.
Hanke H. Martin: "Bedienungsanleitung BNG-2009 / 2010 / 2013" Blindnietgeraet Ausgabedatum: Apr. 2011 Firmware: 2.0PC-Software: 2.0, operating instructions riveting device and software, p. 32, 33, Apr. 1, 2011 (Apr. 1, 2011). XP055778165 Retrieved from the Internet: URL: http://docplayer.org/111046396-Bedienungsanleitung-bng-2009-2010-2013.html [retrieved by EPO on Feb. 22, 2021].
Office Action and Search Report from the Chinese Patent Office dated Mar. 2, 2021 in related application No. 201880036083.6, and translation thereof.
Office Action from the Chinese Patent Office dated Mar. 24, 2021 in related application No. 201880036055.4, and translation thereof.
Supplementary European Search Report and Written Opinion dated Mar. 2, 2021 in related application EP 18 83 2363, and examined claims.
Supplementary European Search Report and Written Opinion dated Mar. 4, 2021 in related application EP 18 83 1675, and examined claims.
Office Action dated Jul. 27, 2021 in related U.S. Appl. No. 16/616,874.
Office Action and Search Report from the Chinese Patent Office dated Sep. 25, 2020 in related CN application No. 201880036055.4, and machine translation thereof.
Unpublished U.S. Appl. No. 16/616,874.
Communication dated Jul. 29, 2022 from European Patent Office in related EP application No. 18832363.8, and examined claims 1-6.
Christophe Absi, et al., "Carbon fiber reinforced poly(ether ether ketone) rivets for fastening composite structures", Composite Structures 280 (2022) 114877, pp. 1-13.

* cited by examiner

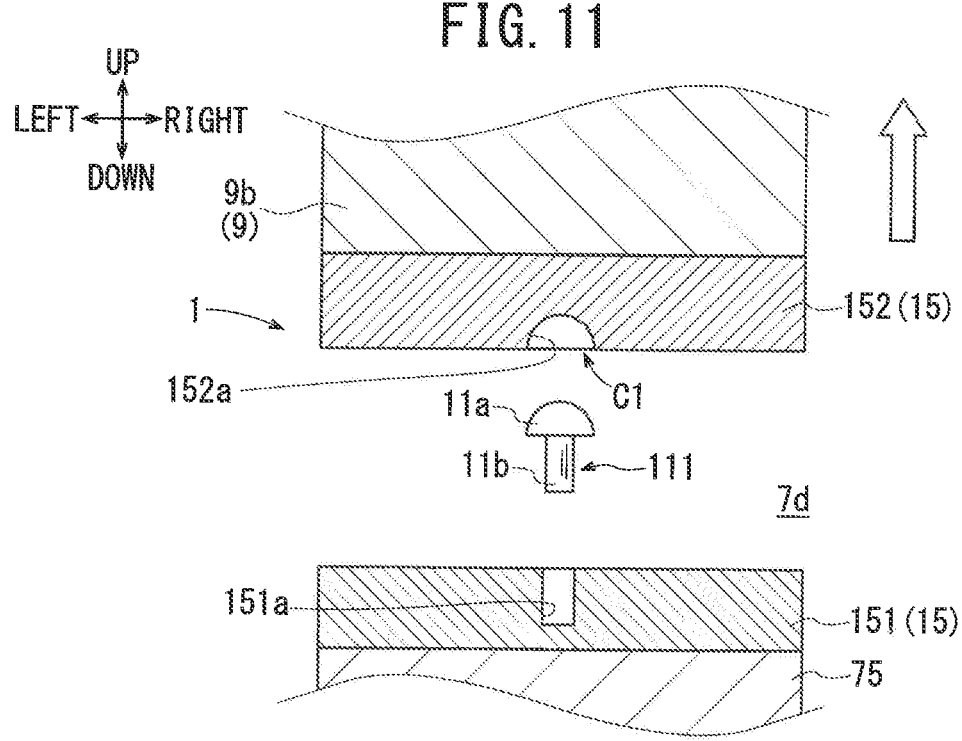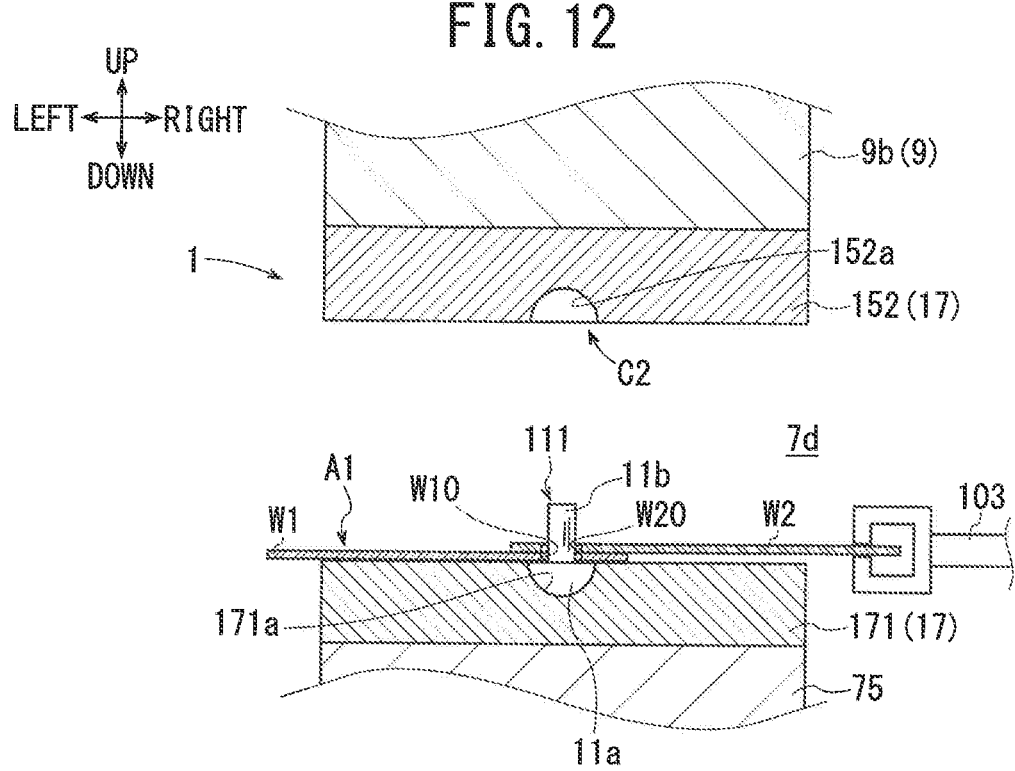

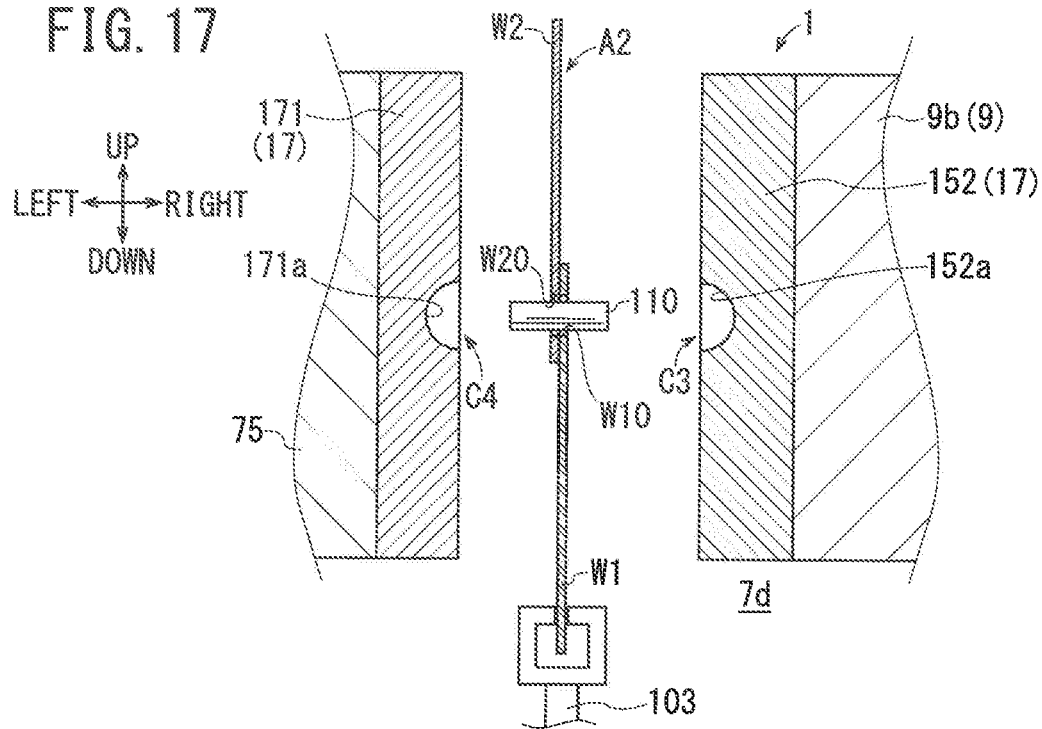
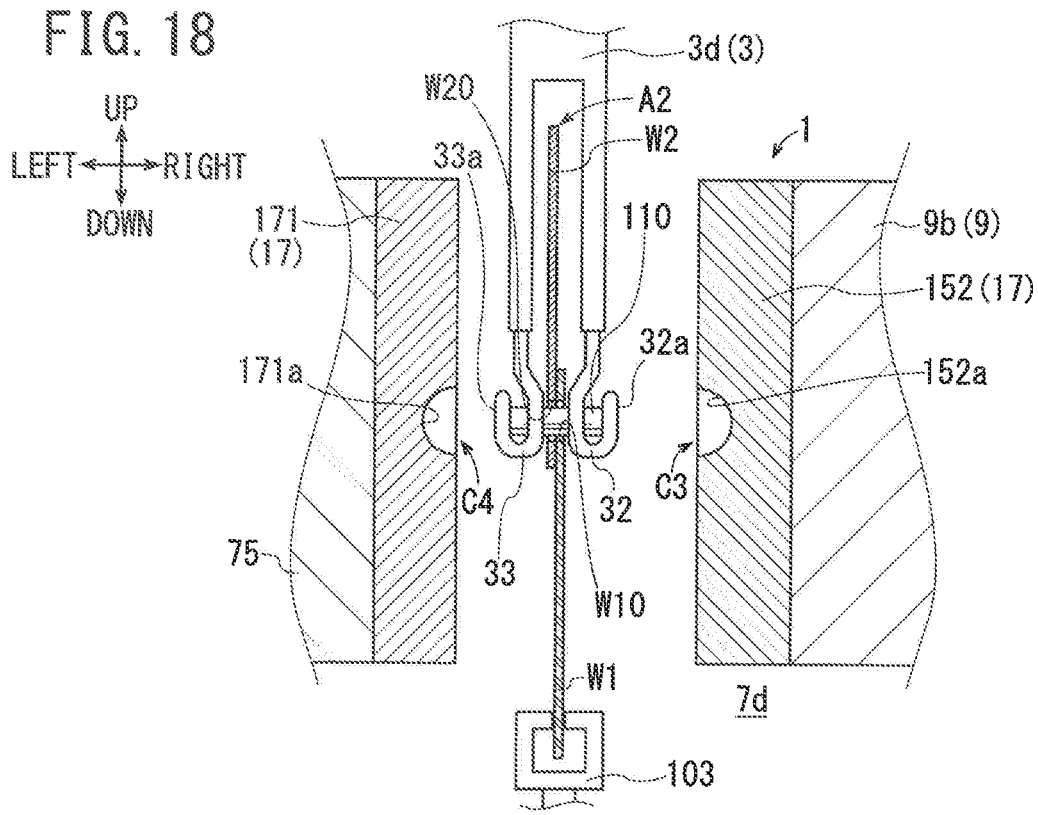

FASTENING METHOD AND FASTENING APPARATUS

The present application is the US national stage of International application serial no. PCT/JP2018/024589 filed on Jun. 28, 2018, which claims priority to International application serial no. PCT/JP2017/046316 filed on Dec. 25, 2017 and to Japanese patent application serial number 2017-134651 filed on Jul. 10, 2017.

TECHNICAL FIELD

The present invention relates to a fastening method and to a fastening apparatus that fasten a plurality of workpieces, through which through holes are provided, using a fastener.

BACKGROUND ART

Various fastening methods that fasten a plurality of workpieces, through which through holes are provided, using a fastener have been proposed in the past. In addition, in recent years, from the viewpoints of reducing the weight of the fastener, preventing corrosion and the like, fastening methods that fasten a plurality of workpieces using a fastener made of a fiber-reinforced resin have also been proposed. Such a fastening method is disclosed in, for example, Japanese Laid-open Patent Publication H4-244609.

In this fastening method, first, a shaft body, which extends in an axial direction and is made of a carbon-fiber-reinforced thermoplastic resin, is prepared. Then, the shaft body is passed through the through hole of each workpiece. Next, the shaft body and the workpieces in this state are disposed between two fastener-forming dies. Next, while both fastener-forming dies are being heated, the shaft body and the workpieces are sandwiched, while being pressed, by the two fastener-forming dies. Thereby, the shaft body is heated by both of the fastener-forming dies, changes to a plastically deformable softened state, and is plastically deformed, owing to the pressure applied by the two fastener-forming dies. As a result, a first head part is formed on one-end side of the shaft body in the axial direction, and a second head part is formed on the other-end side in the axial direction. In addition, a shaft part, which is inserted through the through hole of each workpiece, is formed in the shaft body between the first head part and the second head part. Thus, the shaft body is formed/shaped into a fastener. Thereafter, by cooling the fastener, the fastener fastens the workpieces. Then, by removing the fastener and the workpieces from the fastener-forming dies, the work of fastening the plurality of workpieces using the fastener is complete.

SUMMARY OF THE INVENTION

However, in the above-mentioned known fastening method, because the shaft body is heated by the heat of both heated fastener-forming dies to change the shaft body to a plastically deformable softened state, it is necessary to raise both fastener-forming dies to a high temperature. Consequently, even after the first and second head parts and the shaft part are formed in (on) the shaft body by applying pressure using both fastener-forming dies, both fastener-forming dies maintain a high heat for a long time. As a result, in this known fastening method, it takes a long time until the fastener is cooled. Thereby, in this fastening method, the work of fastening the plurality of workpieces using the fastener cannot be performed quickly.

The present invention was conceived considering the above-mentioned problem and it is an object of the present teachings to provide a fastening method and a fastening apparatus in which the work of fastening a plurality of workpieces using a fastener made of a fiber-reinforced resin can be performed more rapidly.

A first fastening method of the present teachings is a fastening method that fastens a plurality of workpieces, through which through holes are formed, using a fastener, comprising:

a preparing process in which an intermediate piece made of a fiber-reinforced resin is prepared, the intermediate piece comprising a first head part, and a shaft part formed integrally with the first head part and extending in an axial direction;

a shaft-part heating process that heats the shaft part in a noncontacting state while the shaft part is inserted through each of the through holes of each of the workpieces; and a fastening process that forms a second head part on a side of the shaft part opposite of the first head part using a fastener-forming die and thereby fastens the workpieces using the intermediate piece as the fastener by applying pressure to the heated shaft part while the shaft part is inserted through each of the through holes of each of the workpieces;

wherein:

the fiber-reinforced resin is a carbon-fiber-reinforced thermoplastic resin; and the shaft-part heating process is performed using a high-frequency induction coil capable of induction heating the shaft part.

In the above-mentioned first fastening method of the present teachings, the shaft-part heating process is performed using the high-frequency induction coil capable of induction heating. Here, the intermediate piece prepared in the preparing process is made of a carbon-fiber-reinforced thermoplastic resin that employs a thermoplastic resin, which is softened by heating, and employs carbon fibers, which have electrical conductivity as well as excellent heat transfer properties. Consequently, in the shaft-part heating process, the shaft part of the intermediate piece can be directly heated in a non-contacting manner, and thereby softened, by induction heating using the high-frequency induction coil. Owing to the non-contacting heating, the softened resin tends not to adhere to the heat source. Consequently, in this fastening method, there is no need to heat the fastener-forming die in order to heat the end of the shaft part. Therefore, the temperature of the fastener-forming die is low compared to the intermediate piece in which the shaft part is heated. Consequently, in the fastening process, the heat of the fastener, which was obtained from the intermediate piece, can be absorbed by the fastener-forming die. As a result, according to this fastening method, the resulting fastener can be cooled quickly, compared with the situation in which the fastener is obtained by heating the fastener-forming die.

Therefore, according to the first fastening method of the present teachings, the work of fastening the plurality of workpieces using the fastener made of a fiber-reinforced resin can be performed more rapidly.

A second fastening method of the present teachings is a fastening method that fastens a plurality of workpieces, through which through holes are formed, using a fastener, comprising:

a preparing process in which a shaft body, which is made of a fiber-reinforced resin and extends in an axial direction, is prepared;

a shaft-body heating process that heats the shaft body in a noncontacting state while the shaft body is not inserted through each of the through holes of each of the workpieces;

an intermediate forming process that forms an intermediate piece, which comprises a first head part and a shaft part formed integrally with the first head part and extending in the axial direction, using an intermediate-forming die by applying pressure to one-end side of the heated shaft body while the shaft body is not inserted though each of the through holes of each of the workpieces;

a shaft-part heating process that heats the shaft part in a noncontacting state while the shaft part is inserted through each of the through holes of each of the workpieces; and a fastening process that forms a second head part on a side of the shaft part opposite of the first head part using a fastener-forming die and thereby fastens the workpieces using the intermediate piece as the fastener by applying pressure to the heated shaft part while the shaft part is inserted through each of the through holes of each of the workpieces;

wherein:

the fiber-reinforced resin is a carbon-fiber-reinforced thermoplastic resin; and the shaft-body heating process and the shaft-part heating process are each performed using a high-frequency induction coil capable of induction heating the shaft body and the shaft part, respectively.

In addition, a third fastening method of the present teachings is a fastening method that fastens a plurality of workpieces, through which through holes are formed, using a fastener, comprising:

a preparing process in which a shaft body, which is made of a fiber-reinforced resin and extends in an axial direction, is prepared;

a shaft-body heating process that heats the shaft body in a noncontacting state while the shaft body is inserted through each of the through holes of each of the workpieces;

an intermediate forming process that forms an intermediate piece, which comprises a first head part and a shaft part formed integrally with the first head part and extending in the axial direction, using an intermediate-forming die by applying pressure to one-end side of the heated shaft body while the shaft body is inserted though each of the through holes of each of the workpieces;

a shaft-part heating process that heats the shaft part in a noncontacting state while the shaft part is inserted through each of the through holes of each of the workpieces; and a fastening process that forms a second head part on a side of the shaft part opposite of the first head part using a fastener-forming die and thereby fastens the workpieces using the intermediate piece as the fastener by applying pressure to the heated shaft part while the shaft part is inserted through each of the through holes of each of the workpieces;

wherein:

the fiber-reinforced resin is a carbon-fiber-reinforced thermoplastic resin; and the shaft-body heating process and the shaft-part heating process are performed using a high-frequency induction coil capable of induction heating the shaft body and the shaft part, respectively.

In the second fastening method and the third fastening method of the present teachings, the shaft body is directly heated in a noncontacting manner in the shaft-body heating process and thereby softened by induction heating using the high-frequency induction coil. Owing to the non-contacting heating, the softened resin tends not to adhere to the heat source. Consequently, in the intermediate forming process, the heat of the intermediate piece, which was obtained from the shaft body, can be absorbed by the intermediate-forming die. In addition, in the fastening process, the heat of the fastener, which was obtained from the intermediate piece, can be absorbed by the fastener-forming die. As a result, in the second and third fastening methods, the intermediate piece can be cooled more quickly, and the fastener can be cooled more quickly.

Therefore, according to the second fastening method and the third fastening method of the present teachings, the work of fastening a plurality of workpieces using a fastener made of a fiber-reinforced resin can be performed more rapidly.

A fourth fastening method of the present teachings is a fastening method that fastens a plurality of workpieces, through which through holes are formed, using a fastener, comprising:

a preparing process in which a shaft body, which is made of a fiber-reinforced resin and extends in an axial direction, is prepared;

a shaft-body heating process heats the shaft body in a noncontacting state while the shaft body is inserted through each of the through holes of each of the workpieces; and a fastening process that forms a first head part, a shaft part formed integrally with the first head part and extending in the axial direction, and a second head part on a side of the shaft part opposite of the first head part using a fastener-forming die and thereby fastens the workpieces using the shaft body as the fastener by applying pressure to both end sides of the heated shaft body while the shaft body is inserted through each of the through holes of each of the workpieces;

wherein:

the fiber-reinforced resin is a carbon-fiber-reinforced thermoplastic resin; and the shaft-body heating process is performed using a high-frequency induction coil capable of induction heating the shaft body.

In the fourth fastening method, by simultaneously forming the first head part, the second head part, and the shaft part from the shaft body, the fastener can be directly obtained from the shaft body in the fastening process without going through the intermediate piece stage.

Therefore, according to the fourth fastening method of the present teachings, the work of fastening a plurality of workpieces using a fastener made of a fiber-reinforced resin can be performed more rapidly.

A first fastening apparatus of the present teachings is a fastening apparatus that fastens a plurality of workpieces, through which through holes are formed, using a fastener, wherein:

an intermediate piece, which is made of a fiber-reinforced resin and comprises a first head part and a shaft part formed integrally with the first head part and extending in an axial direction, is used;

comprising:

a shaft-part heater capable of heating the shaft part in a noncontacting state while the shaft part is inserted through each of the through holes of each of the workpieces;

a shaft-part pressure-applying apparatus that applies pressure to the heated shaft part while the shaft part is inserted through each of the through holes of each of the workpieces; and a fastener-forming die that forms, from the heated shaft part, a second head part on a side of the shaft part opposite of the first head part, and in which the intermediate piece serves as the fastener;

wherein:
the fiber-reinforced resin is a carbon-fiber-reinforced thermoplastic resin; and
the shaft-part heater is a high-frequency induction coil capable of induction heating the shaft part.

According to the first fastening apparatus of the present teachings, the above-mentioned first fastening method can be implemented.

A second fastening apparatus of the present teachings is a fastening apparatus that fastens a plurality of workpieces, through which through holes are formed, using a fastener, wherein:
a shaft body, which is made of a fiber-reinforced resin and extends in an axial direction, is used;
comprising:
a shaft-body heater capable of heating the shaft body in a noncontacting state while the shaft body is not through each of the through holes of each of the workpieces;
a shaft-body pressure-applying apparatus that applies pressure to one-end side of the heated shaft body while the shaft body is not inserted through each of the through holes of each of the workpieces;
an intermediate-forming die that forms, from the heated shaft body, an intermediate piece comprising a first head part and a shaft part formed integrally with the first head part and extending in the axial direction;
a shaft-part heater capable of heating the shaft part in a noncontacting state while the shaft part is inserted through each of the through holes of each of the workpieces;
a shaft-part pressure-applying apparatus that applies pressure to the heated shaft part while the shaft part is inserted through each of the through holes of each of the workpieces; and
a fastener-forming die that forms, from the heated shaft part, a second head part on a side of the shaft part opposite of the first head part, and in which the intermediate piece serves as the fastener;
wherein:
the fiber-reinforced resin is a carbon-fiber-reinforced thermoplastic resin; and
the shaft-body heater and the shaft-part heater are each a high-frequency induction coil capable of induction heating the shaft body and the shaft part, respectively.

According to the second fastening apparatus of the present teachings, the above-mentioned second fastening method can be implemented.

A third fastening apparatus of the present teachings is a fastening apparatus that fastens a plurality of workpieces, through which through holes are formed, using a fastener, wherein:
a shaft body, which is made of a fiber-reinforced resin and extends in an axial direction, is used;
comprising:
a shaft-body heater capable of heating the shaft body in a noncontacting state while the shaft body is inserted through each of the through holes of each of the workpieces;
a shaft-body pressure-applying apparatus that applies pressure to one-end side of the heated shaft body in the state in which the shaft body is inserted through each of the through holes of each of the workpieces;
an intermediate-forming die that forms, from the heated shaft body, an intermediate piece comprising a first head part and a shaft part formed integrally with the first head part and extending in the axial direction;
a shaft-part heater capable of heating the shaft part in a noncontacting state while the shaft part is inserted through each of the through holes of each of the workpieces;
a shaft-part pressure-applying apparatus that applies pressure to the heated shaft part while the shaft part is inserted through each of the through holes of each of the workpieces; and
a fastener-forming die that forms, from the heated shaft part, a second head part on a side of the shaft part opposite of the first head part, and in which the intermediate piece serves as the fastener;
wherein:
the fiber-reinforced resin is a carbon-fiber-reinforced thermoplastic resin; and
the shaft-body heater and the shaft-part heater are each a high-frequency induction coil capable of induction heating the shaft body and the shaft part, respectively.

According to the third fastening apparatus of the present teachings, the above-mentioned third fastening method can be implemented.

Therefore, according to the first fastening apparatus, the second fastening apparatus, and the third fastening apparatus of the present teachings, the work of fastening a plurality of workpieces using a fastener made of a fiber-reinforced resin can be performed more rapidly.

In each fastening method and each fastening apparatus of the present teachings, if the fastener contains carbon fibers that extend from the first head part to the second head part via the shaft part, then the first and second head parts and the shaft part can be suitably reinforced by the carbon fibers. Consequently, the plurality of workpieces can be securely fastened by the fastener. In addition, if the intermediate piece, the shaft body, or the like contain mutually intersecting carbon fibers, then eddy currents can be suitably created in the shaft part, the shaft body, or the like by induction heating. Consequently, it is possible to suitably bring the shaft part, the shaft body, or the like into a plastically deformable softened state by induction heating.

In the second fastening apparatus and the third fastening apparatus, the shaft-body heater and the shaft-part heater are preferably a single (the same) high-frequency induction coil. In this embodiment, the configuration of the fastening apparatus can be simplified.

According to the first to fourth fastening methods of the present teachings, the work of fastening a plurality of workpieces using a fastener made of a fiber-reinforced resin can be performed more rapidly. In addition, according to the first to third fastening apparatuses of the present teachings, the work of fastening a plurality of workpieces by a fastener made of a fiber-reinforced resin can be performed more rapidly.

BRIEF DESCRIPTION OF THE DRAWINGS

FIG. 11 is a principal-parts enlarged cross-sectional view that shows, according to the fastening apparatus of working example 1, the state in which an intermediate piece has been removed from the first holding die and the head-part forming die.

FIG. 12 is a principal-parts enlarged cross-sectional view that shows, according to the fastening apparatus of working example 1, the state in which the fastener, whose shaft part is inserted through the through hole of each workpiece, is held by a second holding die.

FIG. 17 is a principal-parts enlarged cross-sectional view that shows, according to the fastening apparatus of working example 2, the state in which a shaft body is inserted through the through hole of each workpiece.

FIG. 18 is a principal-parts enlarged cross-sectional view that shows, according to the fastening apparatus of working example 2, the state in which the shaft body is being inductively heated by high-frequency induction coils.

MODES FOR CARRYING OUT THE INVENTION

Working examples 1, 2 and modified examples 1, 2, which embody aspects of the present teachings, are explained below, with reference to the drawings.

WORKING EXAMPLE 1

Figure 1:
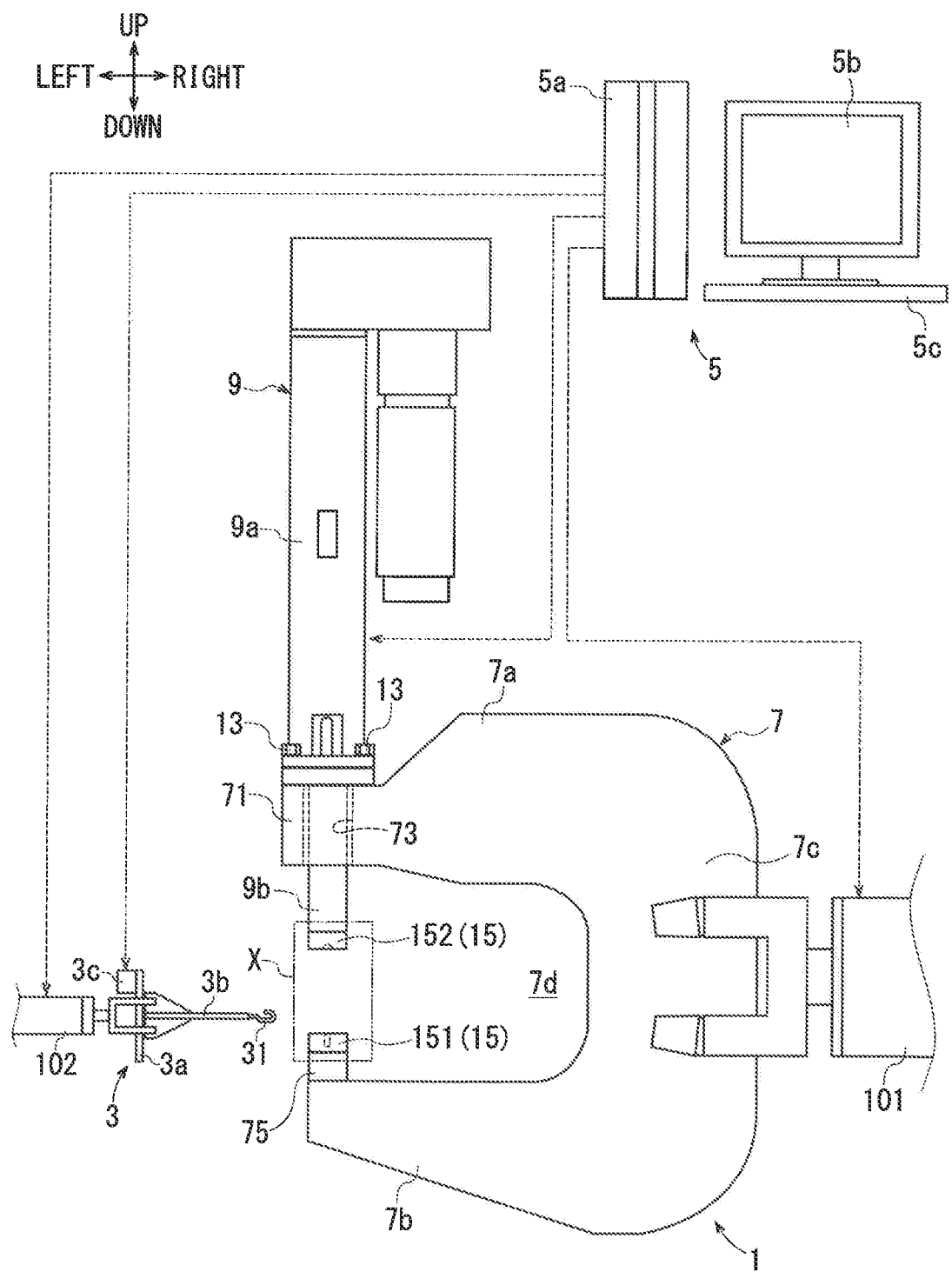
FIG. 1 is a schematic drawing that shows a fastening apparatus of working example 1 according to the present teachings.
Figure 16:
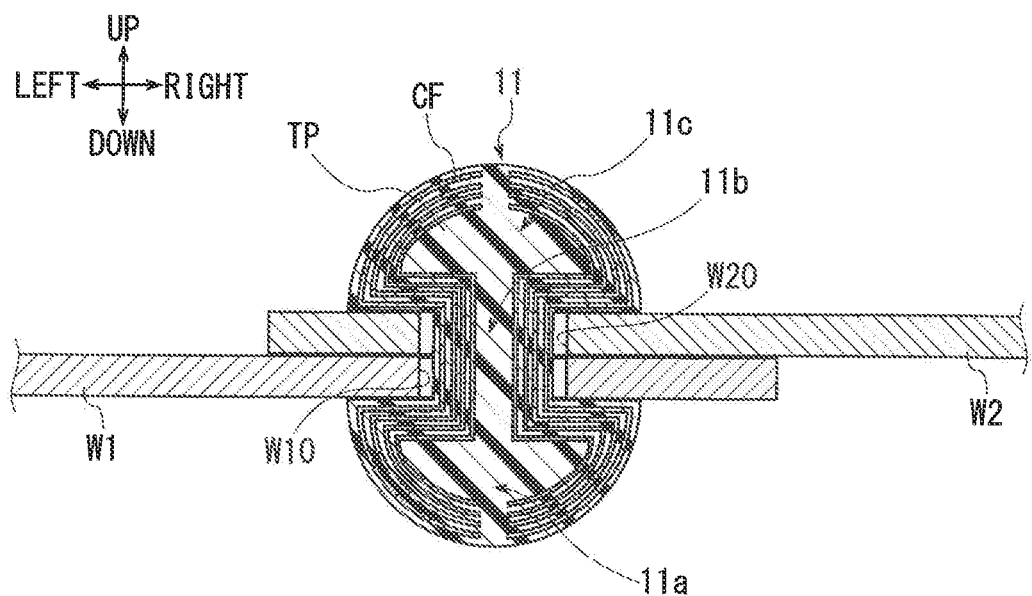
FIG. 16 is a principal-parts enlarged cross-sectional view that shows a fastener that has fastened workpieces according to the fastening apparatus of working example 1.

As shown in FIG. 1, the fastening apparatus of working example 1 comprises a press unit 1, a high-frequency induction heater 3, and a control computer 5. With this fastening apparatus, the work of fastening a first workpiece W1, which is made of metal, and a second workpiece W2, which is also made of metal, using a fastener 11 is performed, as shown in FIG. 16. It is noted that the material of the first workpiece W1 and the second workpiece W2 can be changed as appropriate.

In the present working example, upward of the paper surface in FIG. 1 represents upward of the fastening apparatus, downward of the paper surface in FIG. 1 represents downward of the fastening apparatus, and thereby an up-down direction of the fastening apparatus is defined. In addition, rightward of the paper surface in FIG. 1 represents rightward of the fastening apparatus, leftward of the paper surface in FIG. 1 represents leftward of the fastening apparatus, and thereby a left-right direction of the fastening apparatus is defined. In addition, FIGS. 6, 7, 9-15, 17-20 are cross-sectional views in which area X in FIG. 1 is enlarged. Furthermore, in FIG. 6, etc., the up-down direction and the left-right direction are defined in correspondence with FIG. 1. It is noted that the up-down direction and the left-right direction are but one example and can be modified as appropriate.

As shown in FIG. 1, the press unit 1 comprises a support member 7 and a servo press 9. The support member 7 comprises an upper-end part 7a located on an upper side, a lower-end part 7b located on a lower side, and a grasp part 7c that connects the upper-end part 7a and the lower-end part 7b and is substantially U-shaped. In addition, in the support member 7, a work space (gap) 7d is formed between the upper-end part 7a and the lower-end part 7b. A first pedestal 71 for mounting the servo press 9 is provided on the upper-end part 7a. A through hole 73, which faces the work space 7d and extends in the up-down direction, is formed in the first pedestal 71. A second pedestal 75 is provided, such that it is located inside the work space 7d, on the lower-end part 7b. A first holding die 151 and a second holding die 171, which are described below, are mountable on the second pedestal 75. The work space 7d is open leftward, and a (first) high-frequency induction coil 3b of the high-frequency induction heater 3 is capable of advancing therein. The grasp part 7c is rightward of the work space 7d and extends in the up-down direction.

The servo press 9 comprises a press main body 9a and a press head 9b. The servo press 9 is one example of a "shaft-body pressure-applying apparatus" and a "shaft-part pressure-applying apparatus" in the present teachings. Although not shown in the drawings, a servomotor, a press controller that controls the operation of the servomotor, and the like are provided inside the press main body 9a. The press head 9b is mounted on the press main body 9a. The press head 9b is capable of lengthening and shortening relative to the press main body 9a while the speed, the pressure, or the like is appropriately changed by the servomotor. A head-part forming die 152, which is described below, is mounted on the press head 9b.

Figure 6:
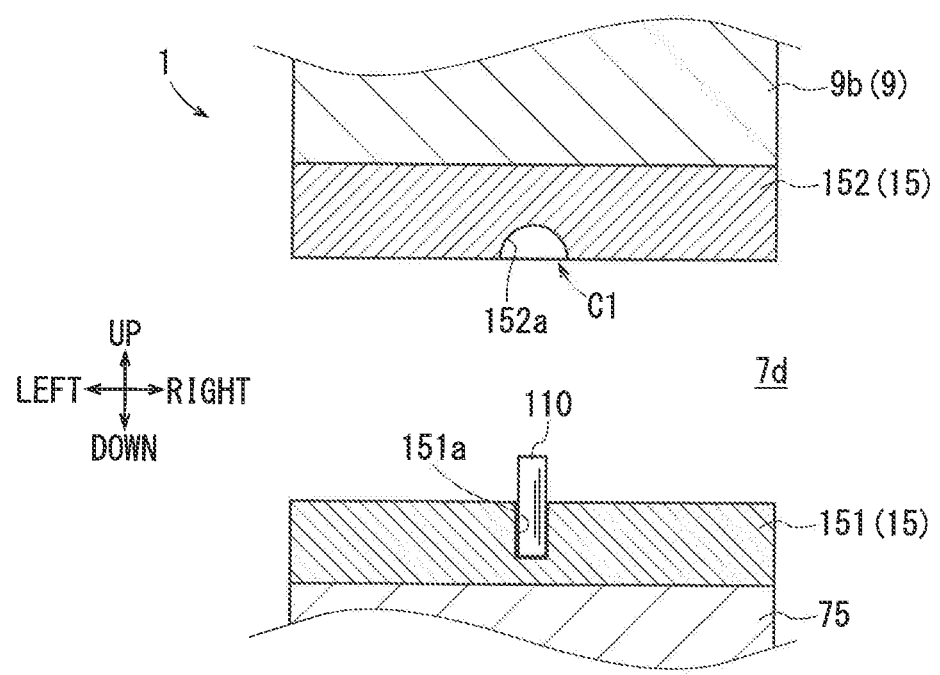
FIG. 6 is a principal-parts enlarged cross-sectional view that shows, according to the fastening apparatus of working example 1, the state in which the shaft body is held by a first holding die.
Figure 7:
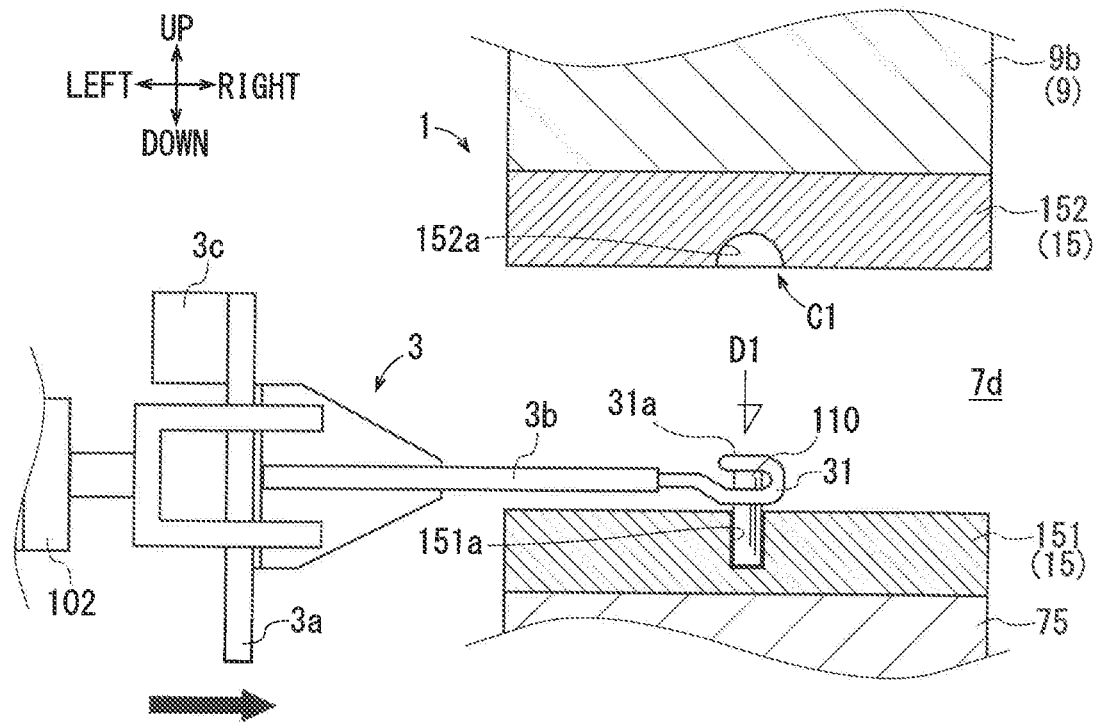
FIG. 7 is a principal-parts enlarged cross-sectional view that shows, according to the fastening apparatus of working example 1, the state in which the shaft body is inductively heated by a high-frequency induction coil.
Figure 10:
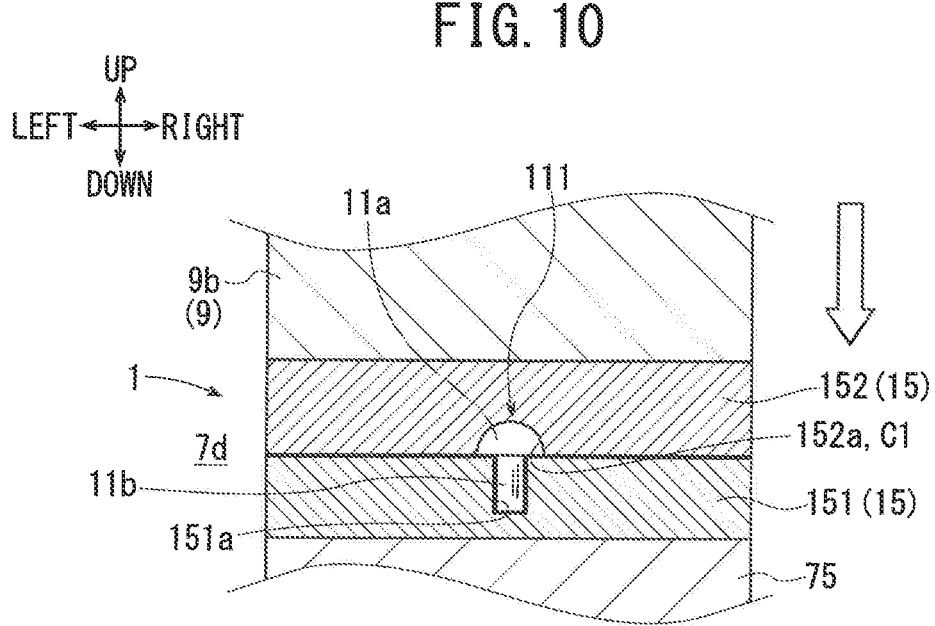
FIG. 10 is a principal-parts enlarged cross-sectional view that shows, according to the fastening apparatus of working example 1, the state in which a first head part and a shaft part are formed in (on) the shaft body.
Figure 15:
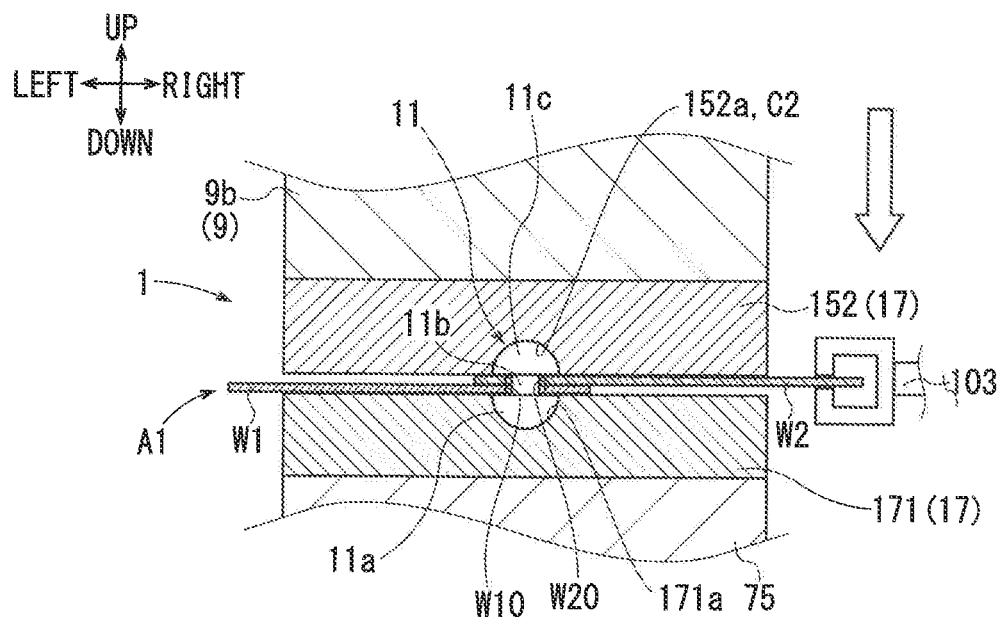
FIG. 15 is a principal-parts enlarged cross-sectional view that shows, according to the fastening apparatus of working example 1, the state in which a second head part is formed, and the workpieces are fastened by the resulting fastener.
Figure 20:
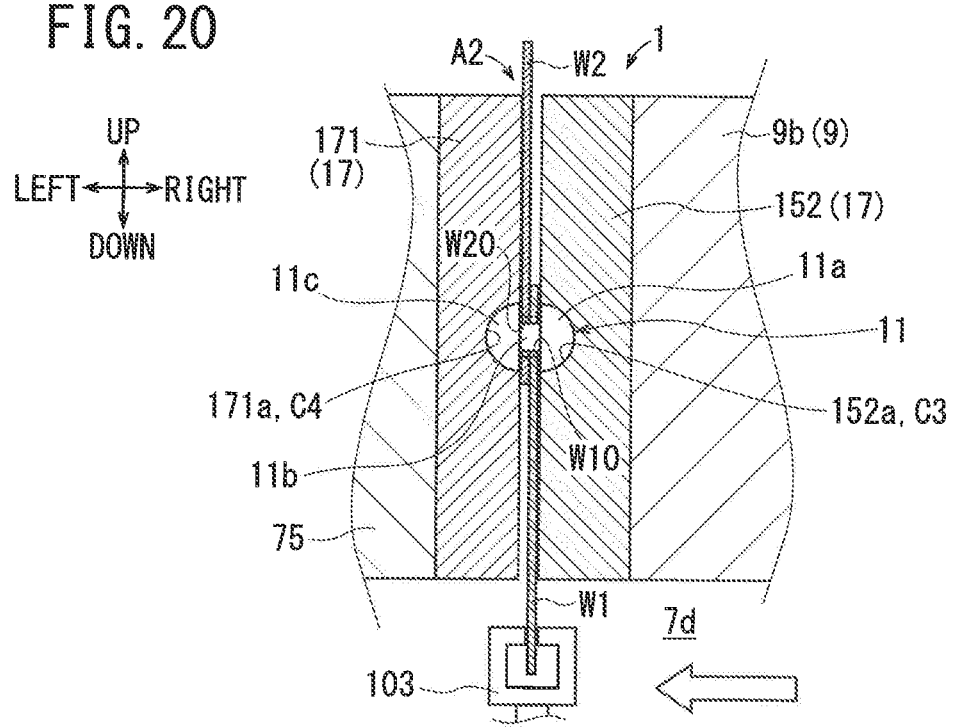
FIG. 20 is a principal-parts enlarged cross-sectional view that shows, according to the fastening apparatus of working example 2, the state in which the first head part, the second head part, and the shaft part are formed, and the workpieces are fastened by the fastener.

In the press unit 1, the press main body 9*a* is fixed, by a plurality of bolts 13, to the first pedestal 71 in the state in which the press head 9*b* has been passed through the through hole 73. Thus, in the press unit 1, the support member 7 and the servo press 9 are integrated. Thus, by advancing and retracting the press head 9*b* relative to the press main body 9*a* and thereby moving the press head 9*b* along its own axial direction inside the work space 7*d*, the press head 9*b* is displaceable to (i) an initial position shown in FIG. 1, (ii) a standby position shown in FIG. 6, FIG. 7, etc., and (iii) a press position shown in FIG. 10, etc. The initial position is the position at which the press head 9*b* is farthest from the second pedestal 75 inside the work space 7*d*, as shown in FIG. 1. The standby position is the position at which the press head 9*b* is closer to the second pedestal 75, inside the work space 7*d*, than it is at the initial position, as shown in FIG. 6, FIG. 7, etc. The press position is the position at which the press head 9*b* is nearest to the second pedestal 75 inside the work space 7*d*, as shown in FIGS. 10, 15, 20.

In addition, in this fastening apparatus, the press unit 1 is held by a first work arm 101 as shown in FIG. 1. Specifically, the first work arm 101 holds the press unit 1 by grasping the grasp part 7*c* of the support member 7. Although a detailed illustration is not shown, the first work arm 101 is configured such that it is capable of pivoting, extending, and retracting while it is grasping the grasp part 7*c*. Therefore, under the control of the control computer 5, the first work arm 101 can hold the press unit 1 at an arbitrary angle.

Figure 8:
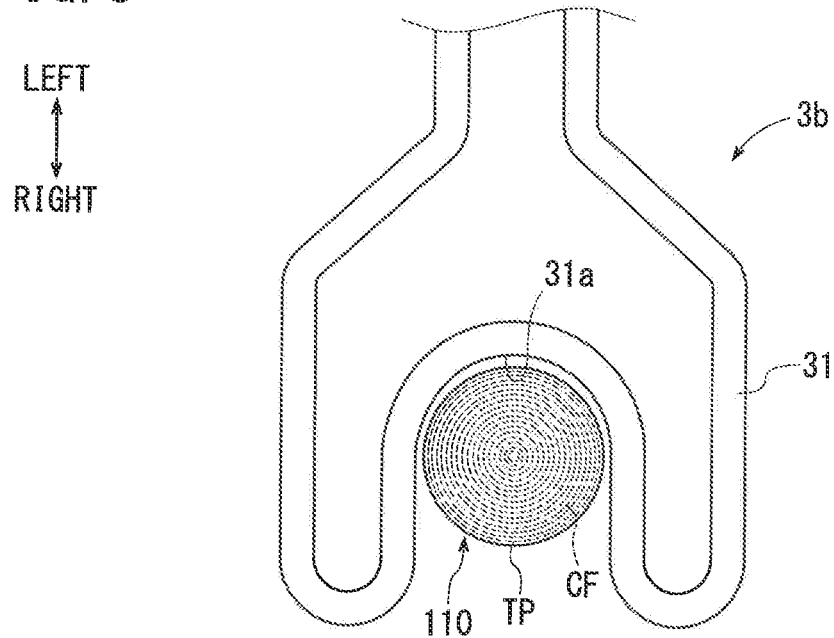
FIG. 8 is a top view for the situation in which, according to the fastening apparatus of working example 1, the shaft body and the high-frequency induction coil are viewed from direction D1 in FIG. 7.

As shown in FIG. 1 and FIG. 7, the high-frequency induction heater 3 comprises a main-body part 3*a*, the first high-frequency induction coil 3*b*, an energization controller 3*c*, and a temperature sensor that is not shown. The first high-frequency induction coil 3*b* is one example of a "high-frequency induction coil" in the present teachings. The main-body part 3*a* is held by a second work arm 102. The first high-frequency induction coil 3*b* is fixed to the main-body part 3*a* and extends from the main-body part 3*a* side toward the work space 7*d* side of the support member 7. As shown in FIG. 8, one tip part 31 is provided on the work space 7*d* side in (on) the high-frequency induction coil 3*b*. A recessed part 31*a* that is capable of enveloping (configured to partially surround) a shaft body 110, a shaft part 11*b*, or the like, which are described below, is formed in the tip part 31. The energization controller 3*c* shown in FIG. 1 and FIG. 7 is fixed to the main-body part 3*a*. Under the control of the control computer 5, the energization controller 3*c* supplies electric power to the first high-frequency induction coil 3*b*. The temperature sensor detects the temperature of the shaft body 110, the shaft part 11*b*, or the like.

Figure 13:
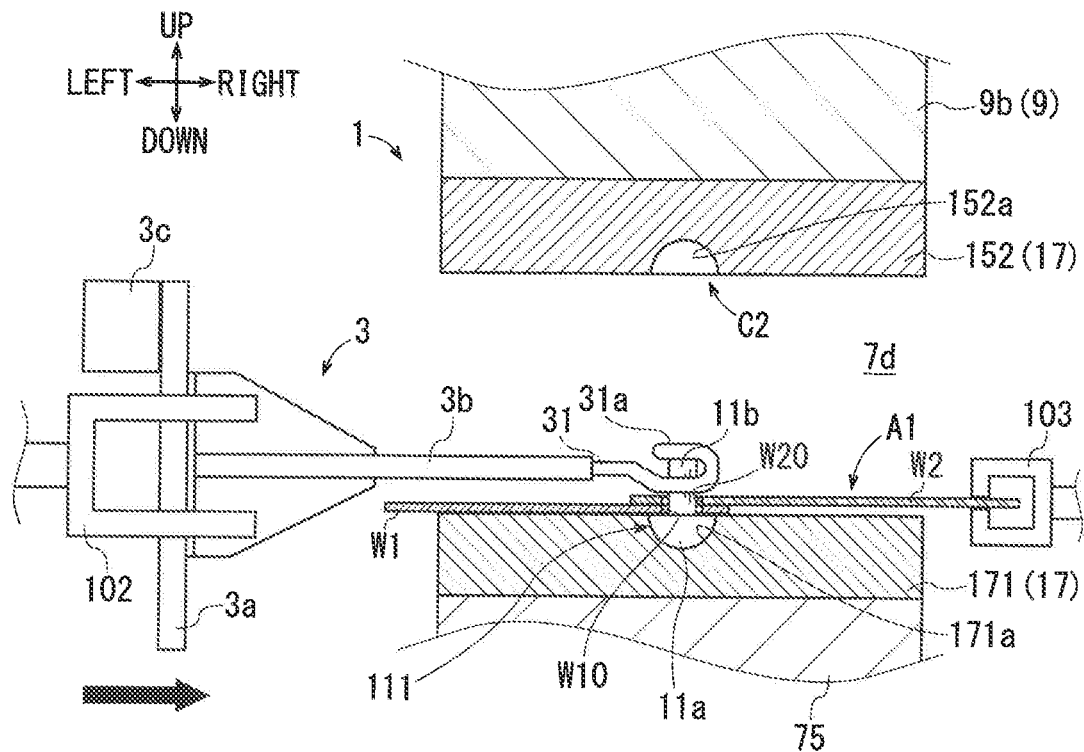
FIG. 13 is a principal-parts enlarged cross-sectional view that shows, according to the fastening apparatus of working example 1, the state in which the shaft part is being inductively heated by the high-frequency induction coil.
Figure 14:
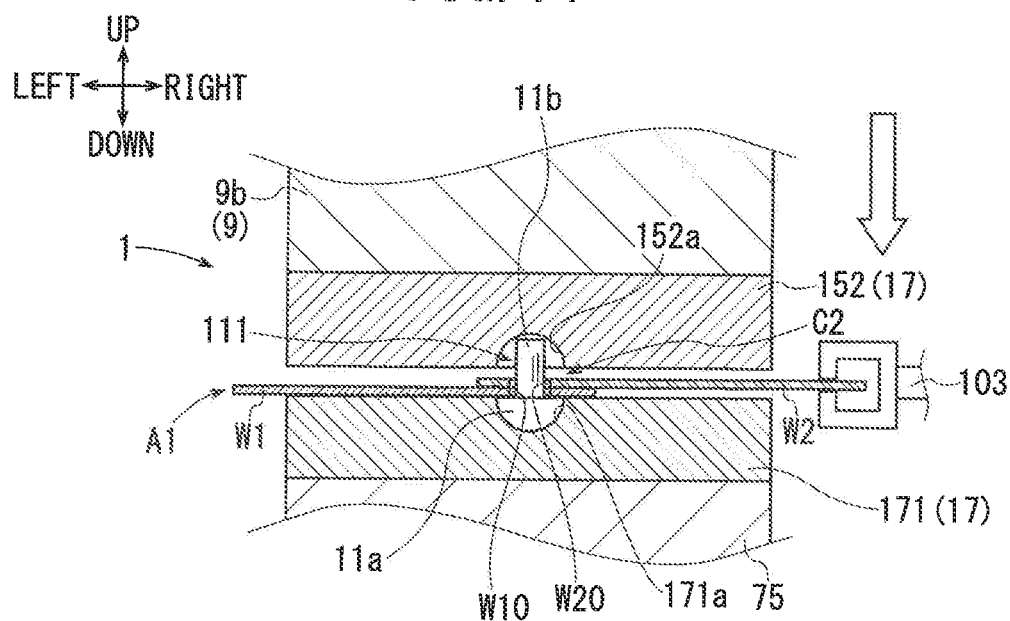
FIG. 14 is a principal-parts enlarged cross-sectional view that shows, according to the fastening apparatus of working example 1, the state in which the head-part forming die has been brought into contact with the shaft part.

The second work arm 102 is configured such that is capable of pivoting, extending, and retracting while it grasps the main-body part 3*a*. Thereby, under the control of the control computer 5, the second work arm 102 can hold the first high-frequency induction heater 3 at an arbitrary angle. In addition, under the control of the control computer 5, the second work arm 102 can move the main-body part 3*a* and thereby displace the first high-frequency induction coil 3*b* to a retracted position as shown in FIG. 1 and to a heating position as shown in FIG. 7, FIG. 13, etc. The retracted position is a position at which the first high-frequency induction coil 3*b* is withdrawn from the interior of the work space 7*d*, as shown in FIG. 1. The heating position is a position at which the first high-frequency induction coil 3*b* has advanced into the work space 7*d*, as shown in FIG. 7, FIG. 13, etc.

The control computer 5 shown in FIG. 1 comprises a computer main body 5*a*, a display 5*b*, and a keyboard 5*c*. An operator, who is not shown, can input via the keyboard 5*c* the dimensions of the shaft body 110, an intermediate piece 111, and the like as well as work data, such as the shape, the material, and the like of the first and second workpieces W1, W2. Although not shown in the drawings, ROM, RAM, a CPU, and the like are housed inside the computer main body 5*a*. Various control programs for controlling the servo press 9, the energization controller 3*c*, the first work arm 101, the second work arm 102, a third work arm 103, which is described below, and the like are stored in ROM. The work data that were input via the keyboard 5*c* are stored in RAM. The CPU performs various operations based on the control programs stored in ROM and the work data stored in RAM. Thus, the control computer 5 performs such control by sending control signals to the servo press 9, the energization controller 3*c*, and the first to third work arms 101-103. The work data input by the operator as well as the operating state of the fastening apparatus and the like are displayed on the display 5*b*.

Figure 2:
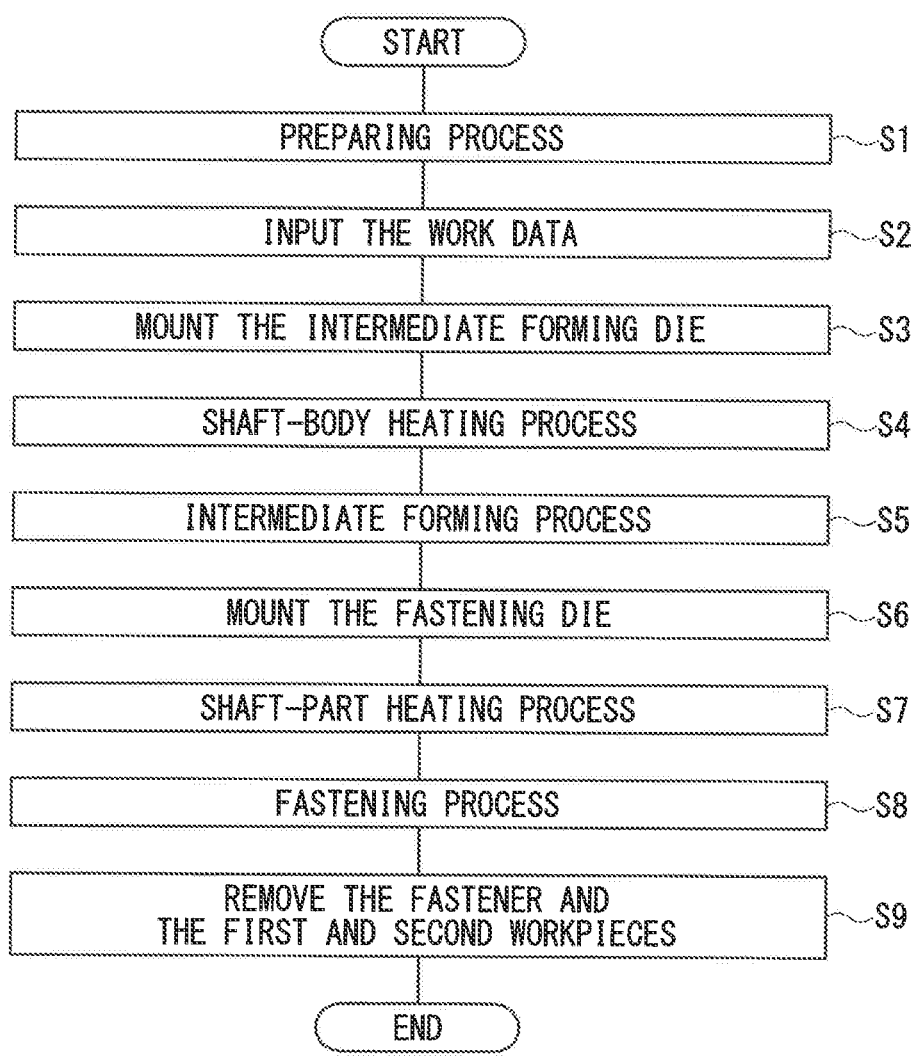
FIG. 2 is a flow chart for explaining how the work of fastening workpieces is performed by the fastening apparatus of working example 1.
Figure 5:
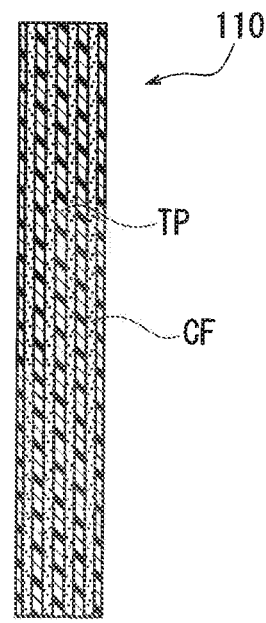
FIG. 5 is a cross-sectional view that shows a shaft body.

In the fastening apparatus configured as described above, by executing a fastening method in accordance with the flow chart shown in FIG. 2, the work of fastening the first workpiece W1 and the second workpiece W2 using the fastener 11 is performed. This is explained in detail below. First, as a preparing process, the shaft body 110 is prepared (step S1). As shown in FIG. 5, the shaft body 110 is composed of a thermoplastic resin (polymer) TP, such as nylon, and a plurality of carbon fibers CF. That is, the shaft body 110 is made of a carbon-fiber-reinforced thermoplastic resin (CFRTP). The shaft body 110 has a circular-columnar shape extending in an axial direction. The dimensions of the shaft body 110 are defined in accordance with the shapes of the first and second workpieces W1, W2 to be fastened. In addition, each carbon fiber CF extends from one-end side to the other-end side of the shaft body 110 in the axial direction. Thereby, the length of the shaft body 110 in the axial direction and the length of each carbon fiber CF are substantially equal. It is noted that, in FIG. 5 and FIG. 16, to facilitate the explanation, the number of the carbon fibers CF is simplified and the shapes of the carbon fibers CF are shown in an exaggerated manner.

Next, the operator inputs the required work data via the keyboard 5*c* (step S2 in FIG. 2). Then, the operator sends, using the control computer 5, a control signal to the first and second work arms 101, 102 to start control of the first and second work arms 101, 102. Thereby, as shown in FIG. 1, the first work arm 101 holds the press unit 1 in the state in which the servo press 9 is stood up in the up-down direction. In addition, the second work arm 102 positions the high-frequency induction heater 3 leftward of the press unit 1.

Next, the operator mounts an intermediate-forming die 15 on the press unit 1 (step S3 in FIG. 2). As shown in FIG. 6, the intermediate-forming die 15 comprises the first holding die 151 and the head-part forming die 152. In the first holding die 151, a first recessed part 151*a*, which is capable of holding the shaft body 110, is formed in a circular-columnar shape. Here, the length of the first recessed part 151*a*, that is, the depth of the first recessed part 151*a*, is shorter than the axial length of the shaft body 110. The first holding die 151 is mounted on the second pedestal 75 of the support member 7 in the state in which the first recessed part 151*a* faces the press head 9*b* side. On the other hand, a second recessed part 152*a*, which has a semispherical shape, is formed in the head-part forming die 152. The second recessed part 152*a* is formed with a diameter larger than that of the first recessed part 151*a*. The head-part forming die 152 is mounted on the press head 9*b* in the state in which the second recessed part 152a faces the first holding die 151 side. Thereby, a first cavity C1 is formed between the second recessed part 152a and the first holding die 151.

Next, a shaft-body heating process is performed (step S4 in FIG. 2). This shaft-body heating process is performed based on the control flow shown in FIG. 3. In this shaft-body heating process, the shaft body 110 is heated in a noncontacting state without inserting the shaft body 110 through the through holes W10, W20 of the first and second workpieces W1, W2. When the shaft-body heating process is performed, first, the operator causes the shaft body 110 to be held (placed) in the first holding die 151 (step S401). Specifically, as shown in FIG. 6, the operator causes the shaft body 110 to be held in the first holding die 151 by inserting the shaft body 110 into the first recessed part 151a. As mentioned above, because the length of the first recessed part 151a is shorter than the axial length of the shaft body 110, the shaft body 110, which is held by the first holding die 151, is brought to the state in which, while one-end side of the shaft body 110 in the axial direction is exposed from the first recessed part 151a, the shaft body 110 is stood up in the axial direction. It is noted that the shaft body 110 is inserted into the first recessed part 151a by controlling the third work arm 103, which is shown in FIG. 12, etc., according to instructions output by the control computer 5.

Figure 3:
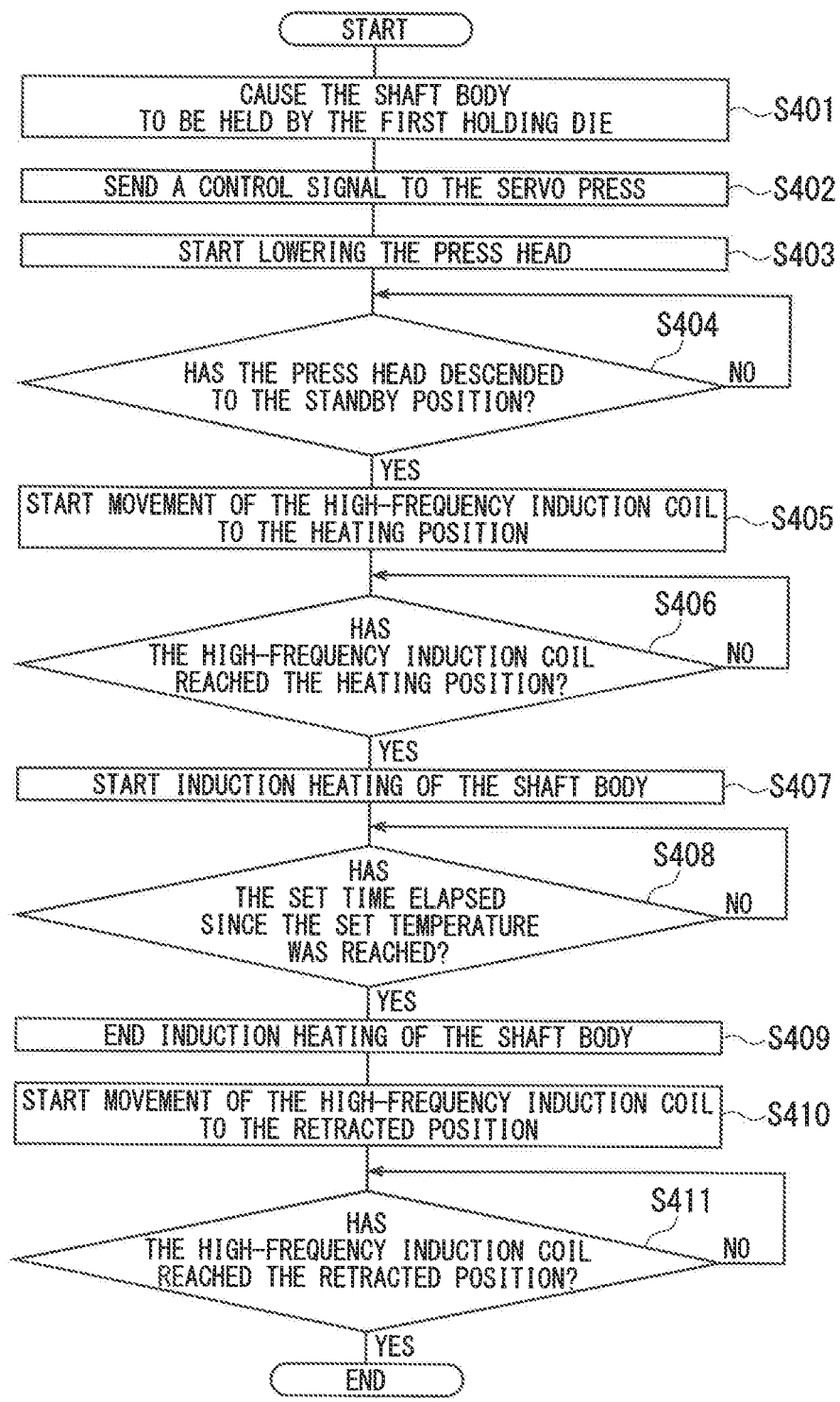
FIG. 3 is a control flow for explaining how a shaft-body heating process is performed by the fastening apparatus of working example 1.

After causing the shaft body 110 to be held by the first holding die 151, the operator sends, using the control computer 5, a control signal to the servo press 9 (step S402 in FIG. 3). Thereby, in the press unit 1, the servo press 9 actuates the press head 9b. Consequently, the press head 9b starts to descend from the initial position shown in FIG. 1 toward the second pedestal 75 and, in turn, toward the first holding die 151 (step S403 in FIG. 3). The descending of the press head 9b continues until the press head 9b reaches the standby position (step S404: NO). Furthermore, as shown in FIGS. 6, 7, when the press head 9b reaches the standby position within the work space 7d, the servo press 9 stops the descending of the press head 9b (step S404: YES).

Thus, when the press head 9b reaches the standby position, the control computer 5 sends a control signal to the second work arm 102. Thereby, as indicated by a black arrow in FIG. 7, the second work arm 102 moves the high-frequency induction heater 3 toward the press unit 1 and thus the first high-frequency induction coil 3b starts the movement from the retracted position shown in FIG. 1 toward the heating position shown in FIG. 7 (step S405 in FIG. 3). Here, unless the first high-frequency induction coil 3b has reached the heating position, the second work arm 102 continues the movement of the high-frequency induction heater 3 (step S406: NO). Then, when the first high-frequency induction coil 3b reaches the heating position, the second work arm 102 stops the movement of the high-frequency induction heater 3 (step S406: YES).

As shown in FIG. 8, as the first high-frequency induction coil 3b approaches the heating position, the tip part 31 of the first high-frequency induction coil 3b approaches the shaft body 110 within the work space 7d until the one-end (upper) side of the shaft body 110 is received within the recessed part 31a formed in the tip part 31. It is noted that, even when the first high-frequency induction coil 3b reaches the heating position, the first high-frequency induction coil 3b, including the recessed part 31a, does not contact the shaft body 110.

Thus, in the state in which the first high-frequency induction coil 3b is located at the heating position, the control computer 5 sends a control signal to the energization controller 3c. Thereby, the energization controller 3c starts the supply of electrical current to the first high-frequency induction coil 3b. Consequently, the first high-frequency induction coil 3b generates magnetic force lines. In this regard, it is noted that the shaft body 110 is made of CFRTP, which contains a plurality of carbon fibers CF, and the carbon fibers CF are electrically conductive and exhibit excellent heat transfer properties. Consequently, the shaft body 110, which is received within the recessed part 31a, internally generates eddy currents owing to the effects of the magnetic force lines. Thereby, the shaft body 110 generates heat due to Joule heating thanks to the eddy currents. Thus, induction heating of the shaft body 110 by the first high-frequency induction coil 3b is started (step S407 in FIG. 3). In addition, the temperature sensor detects the temperature of the shaft body 110.

After the one-end (upper) side of the shaft body 110 has reached a set temperature, which is set in advance by the control program, the induction heating of the shaft body 110 continues until a set time, which is set in advance, elapses (step S408: NO). Then, when the temperature of the one-end (upper) side of the shaft body 110 has reached the set temperature and the set time has elapsed (step S408: YES), the control computer 5 ends the supply of electrical current from the energization controller 3c to the induction coil 3. Thus, the induction heating of the shaft body 110 ends (step S409). By undergoing this induction heating, the one-end (upper) side of the shaft body 110 is brought to a plastically deformable softened state due to the generation of heat.

When the induction heating of the shaft body 110 ends, the control computer 5 once again controls the second work arm 102 so as to separate (withdraw) the high-frequency induction heater 3 from the press unit 1. Thereby, the first high-frequency induction coil 3b starts moving from the heating position shown in FIG. 7 toward the retracted position shown in FIG. 1 (step S410 in FIG. 3). The movement of the high-frequency induction heater 3 by the second work arm 102 continues until the first high-frequency induction coil 3b reaches the retracted position (step S411: NO). Furthermore, when the first high-frequency induction coil 3b reaches the retracted position, the second work arm 102 stops the movement of the high-frequency induction heater 3 (step S411: YES). Thus, the shaft-body heating process ends.

Figure 4:
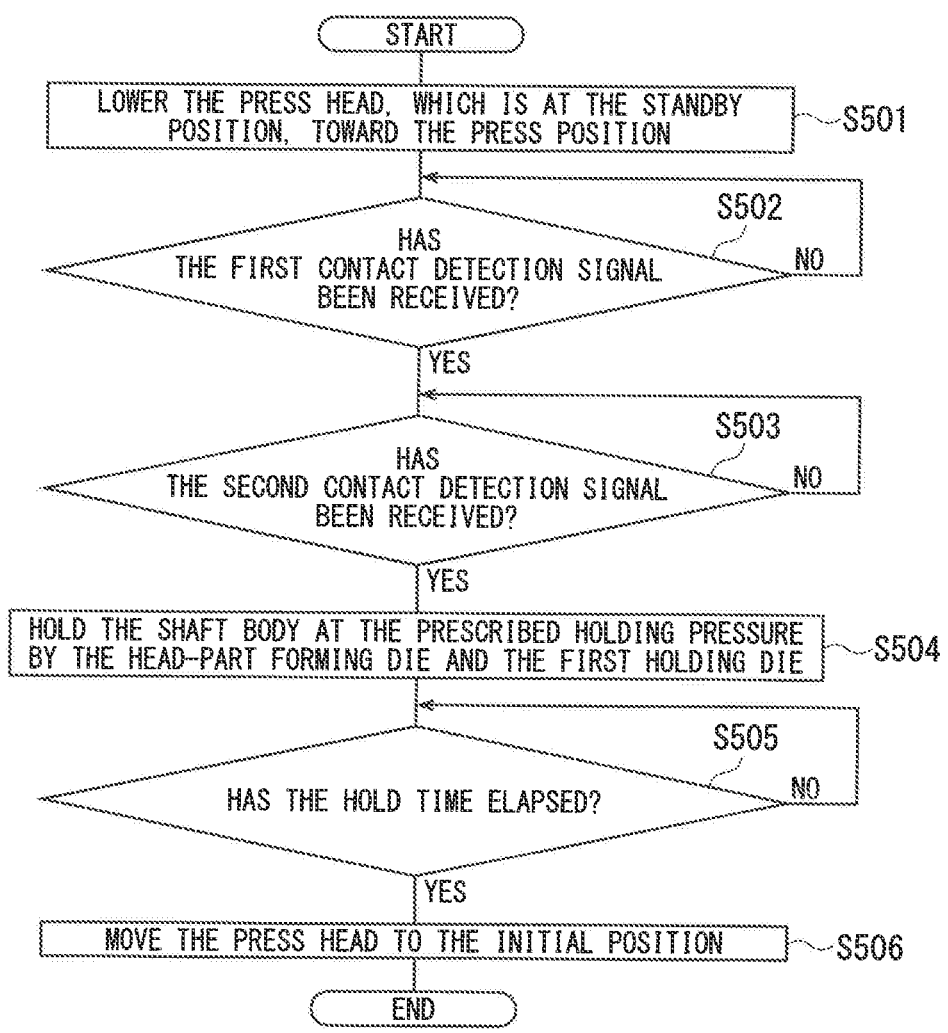
FIG. 4 is a control flow for explaining how an intermediate forming process is performed by the fastening apparatus of working example 1.

Next, the intermediate forming process is performed (step S5 in FIG. 2). The intermediate forming process is performed based on the control flow shown in FIG. 4. In the intermediate forming process, the control computer 5 controls the servo press 9. Thereby, as indicated by a white arrow in FIG. 9, the servo press 9 lowers the press head 9b, which is at the standby position, toward the press position (step S501 in FIG. 4). As described above, in the servo press 9, the press head 9b is capable of extending and contracting relative to the press main body 9a while the speed, the pressure, or the like is appropriately changed by the servomotor. Consequently, when lowering the press head 9b from the standby position toward the press position, the control computer 5 lowers the press head 9b first at a first speed. In addition, at this time, the control computer 5 sets the pressure of the press head 9b to a first pressure.

Figure 9:
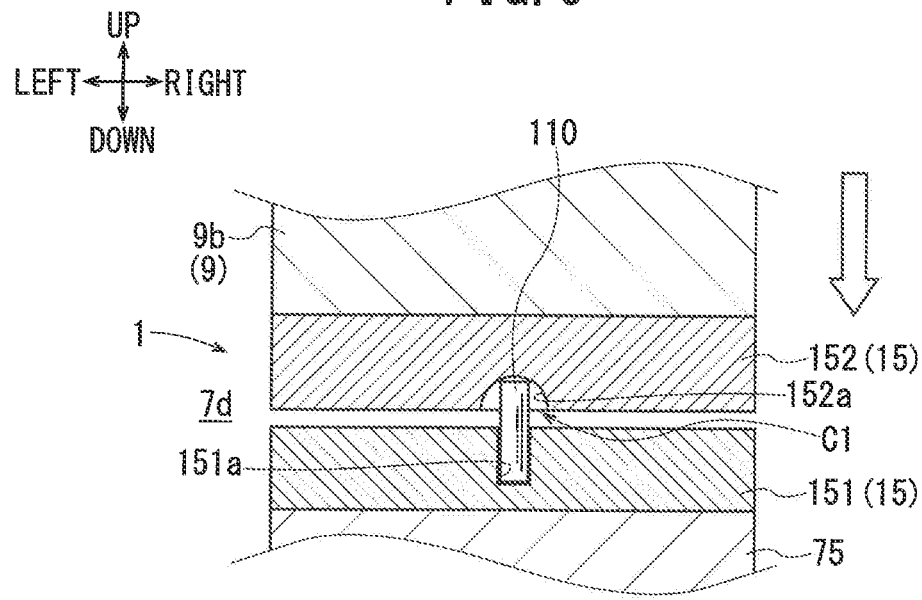
FIG. 9 is a principal-parts enlarged cross-sectional view that shows, according to the fastening apparatus of working example 1, the state in which a head-part forming die has come into contact with the shaft body.

Thus, by virtue of the press head 9b being lowered toward the press position and thereby the first holding die 151 and the head-part forming die 152 approaching one another, the shaft body 110, which is held by the first holding die 151, advances into the second recessed part 152a of the head-part forming die 152 as shown in FIG. 9. Then, by virtue of the shaft body 110 coming into contact with an inner surface of the second recessed part 152a, the servo press 9 detects that the head-part forming die 152 has come into contact with the shaft body 110 and therefore sends a first contact detection signal to the control computer 5. The control computer 5 judges whether the head-part forming die 152 and the shaft body 110 have come into contact with one another based on whether the first contact detection signal has been received. Consequently, until the first contact detection signal is received (step S502: NO in FIG. 4), the control computer 5 lowers the press head 9b at the first speed and at the first pressure. On the other hand, when the control computer 5 receives the first contact detection signal (step S502: YES), the control computer 5 lowers the press head 9b toward the press position while gradually decreasing the speed from the first speed. At the same time, the control computer 5 gradually increases the pressure from the first pressure.

Thereby, the press head 9b further descends toward the press position while plastically deforming the one-end (upper) side of the shaft body 110 using the head-part forming die 152. Furthermore, in the intermediate forming process, by virtue of the press head 9b reaching the press position, the first holding die 151 and the head-part forming die 152 come into contact with one another. In addition, by virtue of the servo press 9 detecting that the first holding die 151 and the head-part forming die 152 have come into contact with one another, the servo press 9 sends a second contact detection signal to the control computer 5. The control computer 5 judges whether the first holding die 151 and the head-part forming die 152 have come into contact with one another based on whether the second contact detection signal has been received. Consequently, until the second contact detection signal is received (step S503: NO), the control computer 5 continues to lower the press head 9b. On the other hand, when the second contact detection signal is received (step S503: YES), the control computer 5 holds the shaft body 110, using the first holding die 151 and the head-part forming die 152, at a prescribed holding pressure (step S504). It is noted that this holding pressure is set in advance by the control program.

Thereby, as shown in FIG. 10, a first head part 11a is formed, by the first cavity C1, on the one-end (upper) side of the shaft body 110. In addition, the shaft part 11b is formed by the portion of the shaft body 110 that is received within the first recessed part 151a. Thus, the intermediate piece (rivet) 111, in which the first head part 11a and the shaft part 11b are formed, is obtained from the shaft body 110. The first head part 11a is formed with a diameter larger than that of the shaft part 11b. In addition, the shaft part 11b is formed integrally with the first head part 11a and extends in the axial direction.

The holding of the shaft body 110 by the first holding die 151 and the head-part forming die 152 continues until a hold time, which is set in advance by the control program, elapses (step S505: NO in FIG. 4). Consequently, in the intermediate forming process, the heat of the shaft body 110, which was heated in the above-mentioned shaft-body heating process, and in turn the heat of the intermediate piece 111 obtained from the shaft body 110, is absorbed by the first holding die 151 and the head-part forming die 152, which constitute the intermediate-forming die 15. Furthermore, when the hold time has elapsed (step S505: YES), the control computer 5 controls the servo press 9 so as to displace (lift) the press head 9b toward the initial position, as indicated by the white arrow in FIG. 11 (step S506 in FIG. 4). Thereby, as shown in FIG. 11, the intermediate piece 111 is removed from the intermediate-forming die 15 and the intermediate forming process ends. It is noted that, although not shown in the drawings, the removal of the intermediate piece 111 from the intermediate-forming die 15 is performed by the third work arm 103.

Next, in place of the intermediate-forming die 15, the operator mounts the fastener-forming die 17 on the press unit 1 (step S6 in FIG. 2). As shown in FIG. 12, the fastener-forming die 17 comprises the second holding die 171 and the head-part forming die 152. That is, in the present working example, the head-part forming die 152 serves both as part of the intermediate-forming die 15 and as part of the fastener-forming die 17. Consequently, in the present working example, with regard to the exchange of the intermediate-forming die 15 with the fastener-forming die 17, it is sufficient merely to exchange the first holding die 151 with the second holding die 171. A third recessed part 171a, which is capable of holding the first head part 11a of the intermediate piece 111 and has a semispherical shape, is formed in the second holding die 171. The second holding die 171 is mounted on the second pedestal 75 of the support member 7 in the state in which the third recessed part 171a faces toward the press head 9b side. Thereby, the third recessed part 171a and the second recessed part 152a face one another. In addition, in the fastener-forming die 17, a second cavity C2 is formed between the second recessed part 152a and the second workpiece W2. It is noted that the shape of the second recessed part 152a is not limited to a semispherical shape and can be designed as appropriate. In addition, the third recessed part 171a can be designed appropriately in accordance with the shape of the second recessed part 152a. Furthermore, the mounting of the intermediate-forming die 15, the fastener-forming die 17, or the like on the press unit 1 may be performed using the third work arm 103, some other work arm, or the like.

Next, a shaft-part heating process is performed (step S7 in FIG. 2). In this shaft-part heating process, the shaft part 11b is heated in the noncontacting state while the shaft part 11b is inserted through the through holes W10, W20 of the first and second workpieces W1, W2. When performing the shaft-part heating process, as shown in FIG. 12, the operator prepares the intermediate piece 111, which was obtained by the intermediate forming process, and prepares the first workpiece W1 and the second workpiece W2, which are to be fastened. The through holes W10, W20, through which the shaft part 11b can pass, are formed in the first and second workpieces W1, W2. The diameter of the first head part 11a is larger than that of each of the through holes W10, W20. Furthermore, the control computer 5 sends a control signal to the third work arm 103. Thereby, the third work arm 103 conveys the intermediate piece 111 to the second holding die 171 and places the first head part 11a in the third recessed part 171a. Thus, the first head part 11a is held by the third recessed part 171a. Thereby, the intermediate piece 111 is brought to the state in which the side of the shaft part 11b opposite the first head part 11a, that is, the other-end side of the shaft part 11b, extends toward the second recessed part 152a of the head-part forming die 152. In addition, the third work arm 103 conveys the first workpiece W1 to the intermediate piece 111 and passes the shaft part 11b through the through hole W10. Thereby, the first workpiece W1 is placed on the second holding die 171. Furthermore, while conveying the second workpiece W2 to the intermediate piece 111 and aligning the through hole W10 and the through hole W20, the third work arm 103 passes the shaft part 11b through the through hole W20. Thus, the first workpiece W1, the second workpiece W2, and the intermediate piece 111 constitute a first assembly A1. It is noted that, by virtue of the third work arm 103 holding the second workpiece W2 even after passing the shaft part 11*b* through the through hole W20, the third work arm 103 continues to hold the first assembly A1. In addition, although the shapes of the through holes W10, W20 are shown in an exaggerated manner in FIG. 12 to FIG. 16 to facilitate the explanation, the through holes W10, W20 and the shaft part 11*b* are formed with substantially the same diameter.

Next, the same as in the shaft-body heating process, by virtue of the control computer 5 controlling the servo press 9, the press head 9*b* is displaced (lowered) from the initial position to the standby position (refer to FIG. 12 and FIG. 13). When the press head 9*b* reaches the standby position, the control computer 5 sends a control signal to the second work arm 102 and, as shown in FIG. 13, thereby moves the first high-frequency induction coil 3*b* to the heating position. By virtue of the first high-frequency induction coil 3*b* reaching the heating position, the other-end side of the shaft part 11*b* is received within the recessed part 31*a* formed in the tip part 31 of the first high-frequency induction coil 3*b*. It is noted that, in this situation, too, the first high-frequency induction coil 3*b* and the shaft part 11*b* do not contact one another.

Furthermore, by virtue of the control computer 5 sending the control signal to the energization controller 3*c* and then the energization controller 3*c* starting the supply of electrical current to the first high-frequency induction coil 3*b*, induction heating of the shaft part 11*b* by the first high-frequency induction coil 3*b* is started. In addition, the temperature sensor detects the temperature of the shaft part 11*b*. Then, the same as in the shaft-body heating process, when the set time since the temperature of the other-end side of the shaft part 11*b* reached the set temperature has elapsed, the induction heating of the shaft part 11*b* ends. Thus, the other-end side of the shaft part 11*b* is brought to the plastically deformable softened state owing to the generation of heat.

In addition, when the induction heating of the shaft part 11*b* ends, the same as in the shaft-body heating process, the first high-frequency induction coil 3*b* is moved (withdrawn) to the retracted position. Thus, the process of heating the shaft part by the first high-frequency induction coil 3*b* ends.

Next, a fastening (fastener-forming) process is performed (step S8 in FIG. 2). When the fastening process is performed, the same as in the intermediate forming process, the control computer 5 controls the servo press 9 so as to lower the press head 9*b*, which is at the standby position, toward the press position, as indicated by the white arrow in FIG. 14. At this time, too, the control computer 5 first lowers the press head 9*b* at the first speed and sets the pressure of the press head 9*b* to the first pressure.

Thus, by virtue of the press head 9*b* descending toward the press position, the other-end side of the shaft part 11*b* advances into the second recessed part 152*a* of the head-part forming die 152. Thereby, the servo press 9 detects that the head-part forming die 152 has come into contact with the shaft part 11*b* and therefore sends a third contact detection signal to the control computer 5. When the control computer 5 receives the third contact detection signal, the same as in the intermediate forming process, the control computer 5 lowers the press head 9*b* toward the press position while gradually decreasing the speed from the first speed. At the same time, the control computer 5 gradually increases the pressure from the first pressure.

Thereby, the press head 9*b* further descends toward the press position while plastically deforming (upsetting) the other-end side of the shaft part 11*b* using the head-part forming die 152. Furthermore, by virtue of the press head 9*b* reaching the press position, the second workpiece W2 and the head-part forming die 152 come into contact with one another in the fastening process as shown in FIG. 15. In addition, when the servo press 9 detects that the second workpiece W2 and the head-part forming die 152 have come into contact with one another, the servo press 9 sends a fourth contact detection signal to the control computer 5. When the control computer 5 receives the fourth contact detection signal, the first assembly A1 is held by the second holding die 171 and the head-part forming die 152 at the prescribed holding pressure until the prescribed hold time elapses. It is noted that the holding pressure and the hold time at this time are the same as in the intermediate forming process. It is noted that the holding pressure and the hold time may be set differently in the intermediate forming process and the fastening process.

Thus, a second head part 11*c* is formed by the second cavity C2 on the other-end side of the shaft part 11*b*. Thereby, the fastener (the upset rivet or two-headed rivet) 11 is obtained from the intermediate piece (rivet) 111. As mentioned above, because the shaft body 110 that forms the intermediate piece 111 is made of CFRTP, the fastener 11 is also made of CFRTP. In the fastener 11, the second head part 11*c* is on the opposite side of the first head part 11*a*, with the shaft part 11*b* sandwiched therebetween. In addition, the same as in the first head part 11*a*, the second head part 11*c* is formed with a diameter larger than that of the shaft part 11*b* and larger than that of each of the through holes W10, W20 of the first and second workpieces W1, W2. Thereby, as shown in FIG. 16, the shaft part 11*b*, which is inserted through the through holes W10, W20, is retained from (on) both sides by the first head part 11*a* and the second head part 11*c*. Thus, the first and second workpieces W1, W2 are fastened by the fastener 11.

In addition, until the hold time elapses, by virtue of the fastener 11 and the first and second workpieces W1, W2 being held by the second holding die 171 and the head-part forming die 152 during the shaft-part heating process, the heat of the heated intermediate piece 111 and, in turn, the heat of the fastener 11 is absorbed by the second holding die 171 and the head-part forming die 152, which constitute the fastener-forming die 17. Then, when the hold time has elapsed, the control computer 5 controls the servo press 9 so as to displace (lift) the press head 9*b* toward the initial position. Thereby, the third work arm 103 removes the first and second workpieces W1, W2, which have been fastened by the fastener 11, from the fastener-forming die 17 (step S9 in FIG. 2). Thus, the fastening process ends, and the work of fastening the first workpiece W1 and the second workpiece W2 is complete.

Thus, with this fastening apparatus, the shaft-body heating process and the shaft-part heating process are performed by the first high-frequency induction coil 3*b*, which is capable of (configured to perform) induction heating. Consequently, in the shaft-body heating process, the one-end side of the shaft body 110 can be directly and locally heated in a non-contacting manner by induction heating using the first high-frequency induction coil 3*b*. Owing to the non-contacting heating, the softened resin tends not to adhere to the heat source. Consequently, with this fastening apparatus, when heating the shaft body 110, there is no need to heat the intermediate-forming die 15. Thereby, compared with the heated shaft body 110, the temperature of the intermediate-forming die 15 is low; and, in the intermediate forming process, the heat of the intermediate piece 111 obtained from the shaft body 110 can be absorbed by the intermediate-forming die 15. Consequently, the intermediate piece 111 can be cooled quickly. In addition, in the shaft-part heating process, the other-end side of the shaft part 11*b* can be directly and locally heated in a non-contacting manner by induction heating using the first high-frequency induction coil 3*b*. Again, at this time as well, the softened resin tends not to adhere to the heat source thanks to the non-contacting heating. Consequently, with this fastening apparatus, when the shaft part 11*b* is being heated, there is no need to heat the fastener-forming die 17. Thereby, compared with the intermediate piece 11I, in which the shaft part 11*b* has been heated, the temperature of the fastener-forming die 17 is also low; and in the fastening (fastener-forming) process, the heat of the fastener 11, which was obtained from the intermediate piece 11I, can be absorbed by the fastener-forming die 17. As a result, with this fastening apparatus, the intermediate piece 11I, the fastener 11, and the like can be cooled quickly. That is, according to this fastening apparatus, each process, from the shaft-part heating process to the intermediate forming process, the shaft-body heating process, and the fastening process, can be performed rapidly.

Therefore, according to the fastening apparatus of working example 1, the work of fastening the first workpiece W1 and the second workpiece W2 using the fastener 11 made of CFRTP can be performed rapidly.

In particular, as shown in FIG. 5, each carbon fiber CF in the shaft body 110 extends from the one-end side to the other-end side in the axial direction. Consequently, after undergoing the intermediate forming process and the fastening process, each carbon fiber CF in the fastener 11 extends from the first head part 11*a* to the second head part 11*c* via the shaft part 11*b*, as shown in FIG. 16. Consequently, the first and second head parts 11*a*, 11*c* and the shaft part 11*b* can be suitably reinforced by the carbon fibers CF. Therefore, for example, even if a large load were to act upon the first workpiece W1, the second workpiece W2, or the like, the first and second head parts 11*a*, 11*c* tend not to be deformed by the first workpiece W1, the second workpiece W2, or the like, and the fastening of the first workpiece W1 and the second workpiece W2 tends not to be released (broken). Thereby, according to this fastening apparatus, the first workpiece W1 and the second workpiece W2 can be securely fastened by the fastener 11, which is made of CFRTP.

In addition, by virtue of the other-end side of the shaft part 11*b* being locally heated in the shaft-part heating process by induction heating using the first high-frequency induction coil 3*b*, the first head part 11*a*, which has been already formed in the intermediate forming process, tends not to be affected by the heat of the shaft part 11*b*. Consequently, even if the shaft part 11*b* is inductively heated, the first head part 11*a* tends not to be thermally deformed thereby, and therefore the quality of the fastener 11 when the first workpiece W1 and the second workpiece W2 have been fastened can be increased. In addition, by virtue of the other-end side of the shaft part 11*b* being locally heated by induction heating using the first high-frequency induction coil 3*b*, the first workpiece W1, the second workpiece W2, and the like tend not to be affected when the shaft part 11*b* is being inductively heated.

Furthermore, with this fastening apparatus, even in the situation in which the shaft body 110 is inductively heated in the shaft-body heating process, and even in the situation in which the shaft part 11*b* is inductively heated in the shaft-part heating process, the inductive heating is performed by a single first high-frequency induction coil 3*b*. Thereby, in the shaft-body heating process and the shaft-part heating process, compared with the situation in which separate (i.e. two different) high-frequency induction coils are used, it is possible to simplify the configuration of the fastening apparatus.

In the fastening apparatus of working example 1, it is possible to perform the work of fastening the first workpiece W1 and the second workpiece W2 using the fastener 11 also according to the methods described below in modified examples 1, 2.

MODIFIED EXAMPLE 1

In modified example 1, induction heating of the shaft body 110, which is in the state in which it is inserted through the first workpiece W1 and the second workpiece W2, is performed in the shaft-body heating process by the first high-frequency induction coil 3*b* in the noncontacting state. Other processes are the same as in modified example 1. In this situation, too, functions and effects the same as those in the working example 1 can be achieved.

MODIFIED EXAMPLE 2

In modified example 2, the intermediate piece 11I, which has been formed in advance, is prepared in the preparing process. Thereby, in modified example 2, it is unnecessary to mount the intermediate forming die 15 on the press unit 1. In addition, in modified example 2, the shaft-body heating process and the intermediate forming process of working example 1 can be omitted. Furthermore, in modified example 2, the shaft part 11*b* is heated in the shaft-part heating process in the noncontacting state while the shaft part 11*b* of the intermediate piece 11I is inserted through each of the through holes W10, W20 of the first and second workpieces W1, W2. Thereby, in modified example 2, the work of fastening the first workpiece W1 and the second workpiece W2 using the fastener 11 can be performed more rapidly.

WORKING EXAMPLE 2

In the fastening apparatus of working example 2, the high-frequency induction heater 3 comprises a second high-frequency induction coil 3*d*, which is shown in FIG. 18, instead of the first high-frequency induction coil 3*b*. The second high-frequency induction coil 3*d* is also one example of a "high-frequency induction coil" in the present teachings. A first tip part 32 and a second tip part 33 are formed on (in) the second high-frequency induction coil 3*d*. The first tip part 32 has a shape the same as that of the tip part 31 in working example 1. The shapes of the second tip part 33 and the first tip part 32 are symmetric. That is, a first recessed part 32*a* is formed in the first tip part 32, and a second recessed part 33*a* is formed in the second tip part 33. The first recessed part 32*a* and the second recessed part 33*a* are capable of enveloping (configured to partially surround) the shaft body 110. The first tip part 32 and the second tip part 33 are provided spaced apart and capable of receiving the first workpiece W1 and the second workpiece W2 therebetween. Furthermore, the first tip part 32 and the second tip part 33 are disposed lined up in the axial direction of the shaft body 110 and, in turn, in the axial direction of the fastener 11. In addition, in this fastening apparatus, the energization controller 3*c* (refer to FIG. 1) is capable of supplying electric power to the second high-frequency induction coil 3*d*. Other structural elements in this fastening apparatus are the same as those in the fastening apparatus of working example 1, identical structural elements are assigned the same symbols, and detailed description related thereto is omitted.

With this fastening apparatus according to working example 2, the work of fastening the first workpiece W1 and the second workpiece W2 using the fastener 11 is performed according to the fastening method below. First, the same as in the fastening apparatus of working example 1, the operator inputs necessary work data via the keyboard 5c. Then, the operator sends control signals, using the control computer 5, to the first and second work arms 101, 102 and thereby starts control of the first and second work arms 101, 102. At this time, the first work arm 101 rotates the press unit 1 in the rightward direction by 90° from the state shown in FIG. 1 and holds the press unit 1. That is, in the press unit 1, the servo press 9 is brought into a horizontal state in the left-right direction. In addition, the second work arm 102 positions the high-frequency induction heater 3 upward of the press unit 1 while holding the high-frequency induction heater 3.

Next, as shown in FIG. 17, the operator mounts the fastener-forming die 17 on the press unit 1. That is, the operator mounts the head-part forming die 152 on the press head 9b. At this time, the head-part forming die 152 is set to the state in which the second recessed part 152a faces the second pedestal 75 side of the support member 7. In addition, the operator mounts the second holding die 171 on the second pedestal 75. At this time, the second holding die 171 is set to the state in which the third recessed part 171a faces the head-part forming die 152 side. A third cavity C3 is formed between the second recessed part 152a and the first workpiece W1. In addition, a fourth cavity C4 is formed between the third recessed part 171a and the second workpiece W2.

Next, the shaft body 110, the first workpiece W1, and the second workpiece W2 are prepared. Then, the third work arm 103 is controlled by the control computer 5, and the shaft body 110 is inserted through the through hole W10 of the first workpiece W1 and the through hole W20 of the second workpiece W2. Thereby, the first workpiece W1, the second workpiece W2, and the shaft body 110 constitute a second assembly A2. Next, the third work arm 103, while holding the first workpiece W1, disposes the second assembly A2 between the head-part forming die 152 and the second holding die 171 within the work space 7d. At this time, the third work arm 103 disposes the second assembly A2 between the head-part forming die 152 and the second holding die 171 in the state in which the shaft body 110 in the second assembly A2 is orthogonal to the up-down direction, that is, in the state in which opposite ends of the shaft body 110 respectively oppose the second recessed part 152a and the third recessed part 171a. It is noted that, in FIG. 17 to FIG. 20, too, although the shapes of the through holes W10, W20 are shown exaggerated to facilitate the explanation, the shaft body 110 and, in turn, the shaft part 11b, is formed with substantially the same diameter as that of each of the through holes W10, W20. Consequently, when the second assembly A2 has been disposed between the head-part forming die 152 and the second holding die 171, the shaft body 110 is prevented, with high reliability, from falling out of the through holes W10, W20.

Next, the shaft-body heating process is performed. In the shaft-body heating process, the shaft body 110 is heated in the noncontacting state while the shaft body 110 is inserted through each of the through holes W10, W20 of the first and second workpieces W1, W2. The control computer 5 displaces the press head 9b from the initial position to the standby position by controlling the servo press 9. In addition, the control computer 5 sends a control signal to the second work arm 102 so as to lower the high-frequency induction heater 3 and, as shown in FIG. 18, move the second high-frequency induction coil 3d to the heating position. Thereby, with regard to the second high-frequency induction coil 3d, one-end side (a first end portion) of the shaft body 110 is received within the first recessed part 32a, which is formed in the first tip part 32, and the other-end side (a second end portion) of the shaft body 110 is received within the second recessed part 33a, which is formed in the second tip part 33. It is noted that, in this situation, too, the second high-frequency induction coil 3d and the shaft body 110 do not contact one another.

Then, when the control computer 5 sends a control signal to the energization controller 3c and then the energization controller 3c starts the supply of electrical current to the second high-frequency induction coil 3d, induction heating of the shaft body 110 by the second high-frequency induction coil 3d is started. Thus, the one-end side (first end portion) and the other-end side (second end portion) of the shaft body 110 are simultaneously heated by the second high-frequency induction coil 3d. Consequently, the opposite ends of the shaft body 110 are both simultaneously brought into a softened state, in which both ends are plastically deformable, by the generation of heat. Then, the same as in the fastening apparatus of working example 1, when the set time since the temperature of the one-end side and the other-end side of the shaft body 110 reached the set temperature has elapsed, induction heating of the shaft body 110 ends. Thereafter, the second work arm 102 moves the second high-frequency induction coil 3d to the retracted position. Thus, the shaft-body heating process ends.

Figure 19:
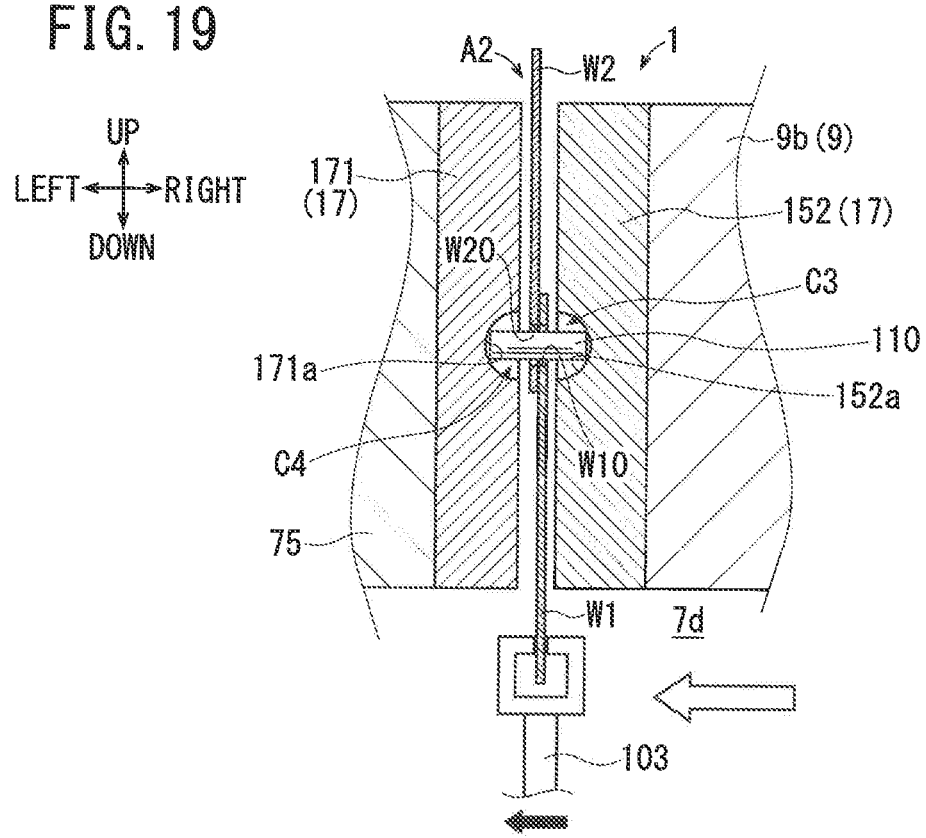
FIG. 19 is a principal-parts enlarged cross-sectional view that shows, according to the fastening apparatus of working example 2, the state in which the head-part forming die and the second holding die are brought into contact with the shaft body.

Next, the control computer 5 controls the servo press 9 and, as indicated by the white arrow in FIG. 19, moves the press head 9b, which is at the standby position, to the press position. At this time, too, the control computer 5 first moves the press head 9b at the first speed and sets the pressure of the press head 9b to the first pressure. In addition, as indicated by the black arrow in the same drawing, in accordance with the movement of the press head 9b to the press position, the third work arm 103 causes the second assembly A2 to gradually approach the second holding die 171.

Thus, as the press head 9b moves toward the press position, the one-end side of the shaft body 110 advances into the second recessed part 152a of the head-part forming die 152, and the other-end side of the shaft body 110 advances into the third recessed part 171a of the second holding die 171. Then, simultaneous with the head-part forming die 152 coming into contact with the one-end side of the shaft body 110, the second holding die 171 comes into contact with the other-end side of the shaft body 110. Thereby, the same as in the fastening apparatus of working example 1, the servo press 9 detects that the head-part forming die 152 has come into contact with the shaft body 110 and therefore sends the first contact detection signal to the control computer 5. Then, when the control computer 5 receives the first contact detection signal, the control computer 5 controls the servo press 9 in the same manner as in the fastening apparatus of working example 1 and thereby moves the press head 9b toward the press position while gradually decreasing the speed from the first speed. At the same time, the control computer 5 gradually increases the pressure from the first pressure.

Thereby, the press head 9b further moves toward the press position while plastically deforming the one-end side of the shaft body 110 using the head-part forming die 152. In addition, the other-end side of the shaft body 110 is also likewise plastically deformed by the second holding die 171. Then, as shown in FIG. 20, when the press head 9*b* of this fastening apparatus reaches the press position, the first workpiece W1 and the head-part forming die 152 come into contact with one another, and the second workpiece W2 and the second holding die 171 come into contact with one another. In addition, when the servo press 9 detects that the first workpiece W1 and the head-part forming die 152 have come into contact, the servo press 9 sends a fifth contact detection signal to the control computer 5. When the control computer 5 receives the fifth contact detection signal, the control computer 5 controls the servo press 9 so as to hold the second assembly A2, by the second holding die 171 and the head-part forming die 152, at the prescribed holding pressure until the prescribed hold time elapses. It is noted that the holding pressure and the hold time at this time are the same as in the fastening apparatus of working example 1.

Thus, the first head part 11*a* is formed by the third cavity C3 on the one-end side of the shaft body 110, and the second head part 11*c* is formed by the fourth cavity C4 on the other-end side of the shaft body 110. In addition, the shaft part 11*b* is formed between the first head part 11*a* and the second head part 11*c*. Thus, the fastener 11 is obtained from the shaft body 110. Thereby, in this fastening apparatus, too, the first and second workpieces W1, W2 are fastened by the fastener 11, and thereby the work of fastening the first workpiece W1 and the second workpiece W2 is complete. In addition, in this fastening apparatus, too, the heat of the fastener 11 is absorbed by the second holding die 171 and by the head-part forming die 152, which constitute the fastener-forming die 17.

Thus, in this fastening apparatus, there is no need to mount the intermediate-forming die 15 on the press unit 1; and in the fastening process, the fastener 11 can be directly obtained from the shaft body 110 without going through the intermediate piece 111 stage. Consequently, with this fastening apparatus, compared with the fastening apparatus of working example 1, the work of fastening the first workpiece W1 and the second workpiece W2 by the fastener 11 can be performed more rapidly.

In addition, in this fastening apparatus, it is possible to simultaneously perform induction heating of the one-end side and the other-end side (i.e. both end portions) of the shaft body 110 in the shaft-body heating process using the single second high-frequency induction coil 3*d*. Consequently, compared with the above-described embodiments in which a high-frequency induction coil that inductively heats only the one-end side of the shaft body 110 and a (e.g., the same or another) high-frequency induction coil that inductively heats only the other-end side of the shaft body 110 are used, the configuration of this fastening apparatus can be simplified. Other functions in this fastening apparatus are the same as those in the fastening apparatus of working example 1.

The above explained the present teachings in accordance with working examples 1, 2 and modified examples 1, 2, but the present invention is not limited to the above-mentioned working examples 1, 2 and modified examples 1, 2, and it is understood that appropriate modifications can be applied within a scope that does not depart from the gist thereof.

For example, in the fastening apparatus of working example 1, the intermediate piece (rivet) 111 alone may be mass produced in advance by repetitively performing the intermediate forming process prior to the performance of the shaft-part heating process.

In addition, with the fastening apparatus of working example 1, regardless of whether the one-end side of the shaft body 110 reaches the set temperature, induction heating of the shaft body 110 may be ended based upon just (solely) the elapsing of the set time. In addition, regardless of whether the temperature of the other-end side of the shaft part 11*b* has reached the set temperature, the induction heating of the shaft part 11*b* may be ended based upon just (solely) the elapsing of the set time. This applies likewise to the fastening apparatus of working example 2.

Furthermore, in the fastening apparatus of working example 2, the high-frequency induction heater 3 may comprise a (e.g., a first) high-frequency induction coil that inductively heats only the one-end side of the shaft body 110 and a (e.g., a second) high-frequency induction coil that inductively heats only the other-end side of the shaft body 110.

In addition, in the fastening apparatus of working examples 1, 2, the intermediate-forming die 15, the fastener-forming die 17, or the like may be configured such that they can be cooled by a coolant.

Furthermore, the shaft body 110 and the intermediate piece 111, and, in turn, the fastener 11, may contain a plurality of intersecting carbon fibers CF.

The present invention can be used in an assembly apparatus of a vehicle, etc.

EXPLANATION OF THE REFERENCE NUMBERS

3*b* First high-frequency induction coil (shaft-part heater, shaft-body heater, high-frequency induction coil)
3*d* Second high-frequency induction coil (shaft-body heater, high-frequency induction coil)
9 Servo press (shaft-body pressure-applying apparatus, shaft-part pressure-applying apparatus)
11 Fastener (two-headed rivet)
11*a* First head part
11*b* Shaft part
11*c* Second head part
15 Intermediate-forming die
17 Fastener-forming die
110 Shaft body
111 Intermediate piece (rivet)
151 First holding die (intermediate-forming die)
152 Head-part forming die (intermediate-forming die, fastener-forming die)
171 Second holding die (fastener-forming die)
CF Carbon fiber
W1 First workpiece (workpiece)
W2 Second workpiece (workpiece)
W10, W20 Through hole

The invention claimed is:

1. A fastening apparatus for fastening a plurality of workpieces, each having a through hole formed therein, using a fastener formed from an intermediate piece, which is made of a thermoplastic polymer reinforced with carbon fibers and comprises a shaft part formed integrally with a first head part and extending in an axial direction, the fastening apparatus comprising:
   a shaft part heater comprising a high-frequency induction coil configured to inductively heat the shaft part of the intermediate piece without the shaft part heater contacting the shaft part by generating magnetic field lines that induce eddy currents in the carbon fibers while the shaft part is inserted through each of the through holes;
a press configured to apply pressure to the heated shaft part while the heated shaft part is inserted through each of the through holes of each of the workpieces; and
a fastener-forming die configured to plastically deform the heated shaft part to form a second head part on an axial end of the shaft part that is opposite of the first head part and thereby form the fastener that fastens the workpieces;
wherein the shaft part heater is configured such that the shaft part heater does not contact the heated shaft part while the second head part is being formed.

2. The fastening apparatus according to claim 1, wherein the high-frequency induction coil is configured to induction heat the shaft part to a softened, plastically deformable state prior to plastically deforming the heated shaft part.

3. The fastening apparatus according to claim 1, wherein the shaft part heater is configured to be moved away from the shaft part after heating the shaft part and to be spaced apart from the heated shaft part while the second head part is being formed.

4. The fastening apparatus according to claim 1, wherein the shaft part heater is configured to heat the shaft part with no solid material intervening between the high-frequency induction coil and the shaft part.

5. The fastening apparatus according to claim 1, wherein:
the high-frequency induction coil is configured to move in a first direction perpendicular to a longitudinal direction of the shaft part between a retracted position and a heating position and to inductively heat the shaft part of the intermediate piece in a noncontacting state in the heating position, and
the press is configured to apply pressure to the heated shaft part by moving in parallel to the longitudinal direction of the shaft part while the heated shaft part is inserted through each of the through holes of each of the workpieces.

6. The fastening apparatus according to claim 1, wherein the high-frequency induction coil is C-shaped.

7. A fastening apparatus for fastening a plurality of workpieces, each having a through hole formed therein, using a fastener formed from a shaft body, which is made of a thermoplastic polymer reinforced with carbon fibers and extends in an axial direction, the fastening apparatus comprising:
a shaft body heater comprising a high-frequency induction coil configured to inductively heat the shaft body without the shaft body heater contacting the shaft body by generating magnetic field lines that induce eddy currents in the carbon fibers while the shaft body is not inserted through the through holes of each of the workpieces;
a press configured to apply pressure to one axial end of the heated shaft body while the heated shaft body is not inserted through the through holes of each of the workpieces;
an intermediate-forming die configured to plastically deform the heated shaft body to form an intermediate piece comprising a shaft part formed integrally with a first head part and extending in the axial direction;
a shaft part heater comprising a high-frequency induction coil configured to inductively heat the shaft part of the intermediate piece without the shaft part heater contacting the shaft part by generating magnetic field lines that induce eddy currents in the carbon fibers while the shaft part is inserted through each of the through holes;
a press configured to apply pressure to the heated shaft part while the heated shaft part is inserted through each of the through holes of each of the workpieces; and
a fastener-forming die configured to plastically deform the heated shaft part to form a second head part on an axial end of the shaft part that is opposite of the first head part and thereby form the fastener that fastens the workpieces;
wherein:
the shaft body heater is configured such that the shaft body heater does not contact the heated shaft body while the intermediate piece is being formed; and
the shaft part heater is configured such that the shaft part heater does not contact the heated shaft part while the second head part is being formed.

8. The fastening apparatus according to claim 7, wherein the high-frequency induction coil is configured to induction heat the shaft part or shaft body to a softened, plastically deformable state prior to plastically deforming the heated shaft part or the heated shaft body.

9. A fastening apparatus for fastening a plurality of workpieces, each having a through hole formed therein, using a fastener formed from a shaft body, which is made of a thermoplastic polymer reinforced with carbon fibers and extends in an axial direction, the fastening apparatus comprising:
a shaft body heater comprising a high-frequency induction coil configured to inductively heat the shaft body without the shaft body heater contacting the shaft body by generating magnetic field lines that induce eddy currents in the carbon fibers while the shaft body is inserted through each of the through holes;
a press configured to apply pressure to one axial end of the heated shaft body while the shaft body is inserted through each of the through holes of each of the workpieces;
an intermediate-forming die configured to plastically deform the heated shaft body to form an intermediate piece comprising a shaft part formed integrally with a first head part and extending in the axial direction;
a shaft part heater comprising a high-frequency induction coil configured to inductively heat the shaft part of the intermediate piece without the shaft part heater contacting the shaft part by generating magnetic field lines that induce eddy currents in the carbon fibers while the shaft part is inserted through each of the through holes;
a press configured to apply pressure to the heated shaft part while the heated shaft part is inserted through each of the through holes of each of the workpieces; and
a fastener-forming die configured to plastically deform the heated shaft part to form a second head part on an axial end of the shaft part that is opposite of the first head part and thereby form the fastener that fastens the workpieces;
wherein:
the shaft body heater is configured such that the shaft body heater does not contact the heated shaft body while the intermediate piece is being formed; and
the shaft part heater is configured such that the shaft part heater does not contact the heated shaft part while the second head part is being formed.

10. The fastening apparatus according to claim 9, wherein the same high-frequency induction coil is configured to induction heat both the shaft body and the shaft part.

11. The fastening apparatus according to claim 9, wherein the high-frequency induction coil is configured to induction heat the shaft part or shaft body to a softened, plastically deformable state prior to plastically deforming the heated shaft part or the heated shaft body.

12. A fastening apparatus for fastening a plurality of workpieces, each having a through hole formed therein, using a fastener formed from a shaft body, which is made of a thermoplastic polymer reinforced with carbon fibers and extends in an axial direction, the fastening apparatus comprising:
- a shaft body heater comprising a high-frequency induction coil configured to inductively heat the shaft body without the shaft body heater contacting the shaft body by generating magnetic field lines that induce eddy currents in the carbon fibers while the shaft body is inserted through each of the through holes of each of the workpieces;
- a press configured to apply pressure to both axial ends of the heated shaft body while the heated shaft body is inserted through each of the through holes; and
- a fastener-forming die configured to plastically deform the heated shaft body into a first head part, a shaft part formed integrally with the first head part and extending in the axial direction, and a second head part on an axial end of the shaft part that is opposite of the first head part, and thereby form the fastener that fastens the workpieces;
- wherein the shaft body heater is configured such that the shaft body heater does not contact the heated shaft body while the first head part, the second head part and the shaft part are being formed.

13. The fastening apparatus according to claim 12, wherein the high-frequency induction coil is configured to induction heat the shaft body to a softened, plastically deformable state prior to plastically deforming the heated shaft body.

* * * * *